(12) United States Patent
Wang et al.

(10) Patent No.: US 12,047,342 B2
(45) Date of Patent: Jul. 23, 2024

(54) INFORMATION PROCESSING METHOD AND APPARATUS, TERMINAL, AND STORAGE MEDIUM

(71) Applicant: Beijing Zitiao Network Technology Co., Ltd., Beijing (CN)

(72) Inventors: Chen Wang, Beijing (CN); Yonghao Zhang, Beijing (CN); Yan Jiang, Beijing (CN); Qianmin Zhang, Beijing (CN); Yongliang Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/144,693

(22) Filed: May 8, 2023

(65) Prior Publication Data

US 2023/0275862 A1     Aug. 31, 2023

Related U.S. Application Data

(63) Continuation of application No. PCT/CN2021/129044, filed on Nov. 5, 2021.

(30) Foreign Application Priority Data

Nov. 6, 2020  (CN) .......................... 202011233869.2
Nov. 6, 2020  (CN) .......................... 202011233877.7

(51) Int. Cl.
*G06F 15/16*     (2006.01)
*H04L 12/18*     (2006.01)
(Continued)

(52) U.S. Cl.
CPC ........ *H04L 51/216* (2022.05); *H04L 12/1813* (2013.01); *H04L 51/04* (2013.01)

(58) Field of Classification Search
CPC .... H04L 51/216; H04L 51/04; H04L 12/1813
(Continued)

(56) References Cited

U.S. PATENT DOCUMENTS 10,021,059 B1 *   7/2018   Rao ..................... G06Q 50/01
10,346,378 B1 *   7/2019   Jones .................. G06F 16/252
(Continued)

FOREIGN PATENT DOCUMENTS

CN          101964717 A         2/2011
CN          103490989 A         1/2014
(Continued)

OTHER PUBLICATIONS

Slack. "Slack Help Center". 2018. pp. 1-6. (Year: 2018).*
(Continued)

*Primary Examiner* — Imad Hussain
(74) *Attorney, Agent, or Firm* — BakerHostetler

(57) ABSTRACT

The present disclosure provides an information processing method and apparatus, a terminal, and a storage medium. The information processing method comprises: receiving input topic information and sending the topic information to a server; displaying the topic information in a preset topic format on a session interface of a session group, the preset topic format having a reply area; receiving reply information used for replying to the topic information; and displaying the reply information in the reply area of the topic information. According to the method of the present disclosure, information is displayed in the form of topic information and reply information, and reply information corresponding to the same topic is displayed corresponding to the same topic information, such that the display mode of information is more reasonable, and a user can conveniently and quickly find information of interest.

25 Claims, 7 Drawing Sheets

(51) Int. Cl.
H04L 51/04 (2022.01)
H04L 51/216 (2022.01)

(58) Field of Classification Search
USPC .......................................................... 709/206
See application file for complete search history.

(56) References Cited

U.S. PATENT DOCUMENTS

| | | | |
|---|---|---|---|
| 2016/0241494 | A1 | 8/2016 | Badge et al. |
| 2018/0198831 | A1 | 7/2018 | Calcaterra et al. |
| 2019/0173812 | A1 | 6/2019 | Higgins et al. |
| 2021/0026523 | A1* | 1/2021 | Jamison ................ G06F 40/186 |
| 2021/0255744 | A1* | 8/2021 | Sullivan ................ G06F 3/0482 |

FOREIGN PATENT DOCUMENTS

| | | |
|---|---|---|
| CN | 105207886 A | 12/2015 |
| CN | 105530174 A | 4/2016 |
| CN | 105869057 A | 8/2016 |
| CN | 105978792 A | 9/2016 |
| CN | 105991418 A | 10/2016 |
| CN | 106302108 A | 1/2017 |
| CN | 106453849 A | 2/2017 |
| CN | 304158250 S | 6/2017 |
| CN | 107342932 A | 11/2017 |
| CN | 107682249 A | 2/2018 |
| CN | 108243086 A | 7/2018 |
| CN | 108494572 A | 9/2018 |
| CN | 109510714 A | 3/2019 |
| CN | 110061909 A | 7/2019 |
| CN | 110191231 A | 8/2019 |
| CN | 110233745 A | 9/2019 |
| CN | 110321036 A | 10/2019 |
| CN | 110597974 A | 12/2019 |
| CN | 110851035 A | 2/2020 |
| CN | 110890970 A | 3/2020 |
| CN | 111049663 A | 4/2020 |
| CN | 111669311 A | 9/2020 |
| CN | 111817947 A | 10/2020 |
| CN | 112350924 A | 2/2021 |
| CN | 112398727 A | 2/2021 |
| CN | 112350924 B | 9/2022 |
| CN | 112398727 B | 4/2023 |
| WO | WO 2016/008432 A1 | 1/2016 |

OTHER PUBLICATIONS

Henrich, Verena. "Introduction to Slack—How to Use". Dec. 13, 2017. pp. 1-15. (Year: 2017).*
Arizona State University. "Slack Workspace Guide for Instructors". Mar. 2019. pp. 1-19. (Year: 2019).*
Atlassian. "How and why to use Slack's threaded messages in channels and Apps". Jan. 30, 2020. p. 1. (Year: 2020).*
Slack. "Use threads to organize discussions". Mar. 20, 2020 (archival date). pp. 1-3. (Year: 2020).*
Liu et al.; "Application of WebSocket and MQTT in Web Real-Time Communication System"; System Construction; vol. 25; 2016; p. 28-33 (contains English Abstract).
International Patent Application No. PCT/CN2021/129044; Int'l Search Report; dated Jan. 28, 2022; 3 pages.
Wu Di; "Design and Implementation of an online multi-person multi-transaction instant messaging system"; Journal of Taiyuan Normal University; vol. 17 No. 2; Jun. 2018; p. 55-58 (contains English Abstract, also see p. 58).

* cited by examiner

INFORMATION PROCESSING METHOD AND APPARATUS, TERMINAL, AND STORAGE MEDIUM

CROSS REFERENCE

This application is a continuation of PCT application Ser. No. PCT/CN2021/129044, titled "INFORMATION PROCESSING METHOD AND APPARATUS, TERMINAL, AND STORAGE MEDIUM", filed on Nov. 5, 2021, which filed based on the Chinese patent application No. 202011233877.7 with a filing date of Nov. 6, 2020 and a title of "INFORMATION PROCESSING METHOD AND APPARATUS, TERMINAL, AND STORAGE MEDIUM" and the Chinese patent application No. 202011233869.2 with a filing date of ate of Nov. 6, 2020 and a title of "COMMUNICATION METHOD AND APPARATUS, TERMINAL, AND STORAGE MEDIUM", and claims priority to these Chinese Patent Application. All contents of these Chinese Patent Application are incorporated herein by reference.

TECHNICAL FIELD

The present disclosure relates to the field of intelligent terminal technology, in particular to an information processing method and apparatus, a terminal, and a storage medium.

BACKGROUND

Instant messaging software has a session interface. A user communicates with other users through the session interface, and the session interface displays communication records of communication information sent by the user. The display of the communication information on the session interface is relatively simple, and the communication information is merely sorted in chronological order, so it is troublesome for the user to find information of interest, and the user experience is poor.

SUMMARY

The present disclosure provides an information processing method and apparatus, a terminal, and a storage medium.

The present disclosure uses the following technical solutions.

In some embodiments, the present disclosure provides an information processing method, comprising:
receiving input topic information and sending the topic information to a server;
displaying the topic information in a preset topic format on a session interface of a session group, with a reply area in the preset topic format;
receiving reply information for replying to the topic information; and
displaying the reply information in the reply area of the topic information.

In some embodiments, the present disclosure provides an information processing method, comprising:
receiving topic information at a session interface of an instant messaging client, and initiating a topic creation request for the topic information to a server, so that the server makes a response of creating a topic; and
generating a first topic interface for the topic at the session interface,
wherein, the session interface is used to display a plurality of first topic interfaces.

In some embodiments, the present disclosure provides a control method for a server, comprising:
receiving topic information from a first user in a session group;
associating the topic information with the first user;
sending the topic information to users in the session group;
receiving reply information from a second user in the session group;
associating the reply information and the topic information with the second user, wherein the reply information is used to reply to the topic information; and
sending the reply information to users in the session group except the second user.

In some embodiments, the present disclosure provides an information processing method, comprising:
obtaining topic information posted in a session group by a first user in the session group;
recording an association relationship between the topic information and the session group, and recording an association relationship between the first user and the topic information; or obtaining a preset action performed by a second user in the session group on the topic information, recording the preset action, and recording an association relationship between the second user and the preset action; or obtaining reply information about the topic information, and recording the reply information and an association relationship between the topic information and the reply information; and
in response to receiving an information obtaining request, filtering, based on a target identifier corresponding to the information obtaining request, the topic information associated with the target identifier, and returning the filtered topic information, wherein the target identifier comprises one or more of a session group identifier, a user identifier, and a topic identifier.

In some embodiments, the present disclosure provides an instant messaging apparatus, comprising:
a transmission unit, configured to receive input topic information and send the topic information to a server; and
a display unit, configured to display the topic information in a preset topic format on a session interface of a session group, with a reply area in the preset topic format, wherein
the transmission unit is further configured to receive reply information for replying to the topic information; and
the display unit is further configured to display the reply information in the reply area of the topic information.

In some embodiments, the present disclosure provides an information processing apparatus, wherein the information processing apparatus is disposed in an instant messaging client and comprises: a topic creation module, configured to receive topic information at a session interface and initiate a topic creation request for the topic information to a server, so that the server makes a response of creating a topic; and
a topic interface generation module, configured to generate a first topic interface for the topic at the session interface, wherein the session interface is used to display a plurality of first topic interfaces.

In some embodiments, the present disclosure provides a control apparatus for a server, comprising:
a transmission module, configured to receive topic information from a first user in a session group; and
a control module, configured to associate the topic information with the first user, wherein the transmission module is further configured to send the topic information to users in the session group;

the transmission module is further configured to receive reply information from a second user in the session group;

the control module is further configured to associate the reply information with the second user, wherein the reply information is used to reply to the topic information; and the transmission module is further configured to send the reply information to users in the session group except the second user.

In some embodiments, the present disclosure provides a terminal, comprising: at least one memory and at least one processor, wherein the at least one memory is configured to store program code, and the at least one processor is configured to call the program code stored in the at least one memory to perform the method according to any one of embodiments above.

In some embodiments, the present disclosure provides a computer-readable storage medium for storing program code, wherein when the program code is executed by a processor, the processor is enabled to perform the method according to any one of embodiments above.

According to the information processing method provided by the embodiments of the present disclosure, input topic information is received and sent to a server; the topic information is displayed in a preset topic format on a session interface of a session group, with a reply area in the preset topic format; reply information for replying to the topic information is received; and the reply information is displayed in the reply area of the topic information. Information is displayed by means of topic information and reply information, and reply information corresponding to the same topic is displayed under the same topic information, so that the display of information is more reasonable, and a user can quickly search for the information of interest.

BRIEF DESCRIPTION OF THE DRAWINGS

These and other features, advantages and aspects of embodiments of the present disclosure will become more apparent in conjunction with the accompanying drawings and with reference to the following specific embodiments. Throughout the accompanying drawings, identical or similar appended marks indicate identical or similar elements. It should be understood that the accompanying drawings are schematic and that the elements and components are not necessarily drawn to scale.

DETAILED DESCRIPTION OF PREFERRED EMBODIMENTS

Figure 1:
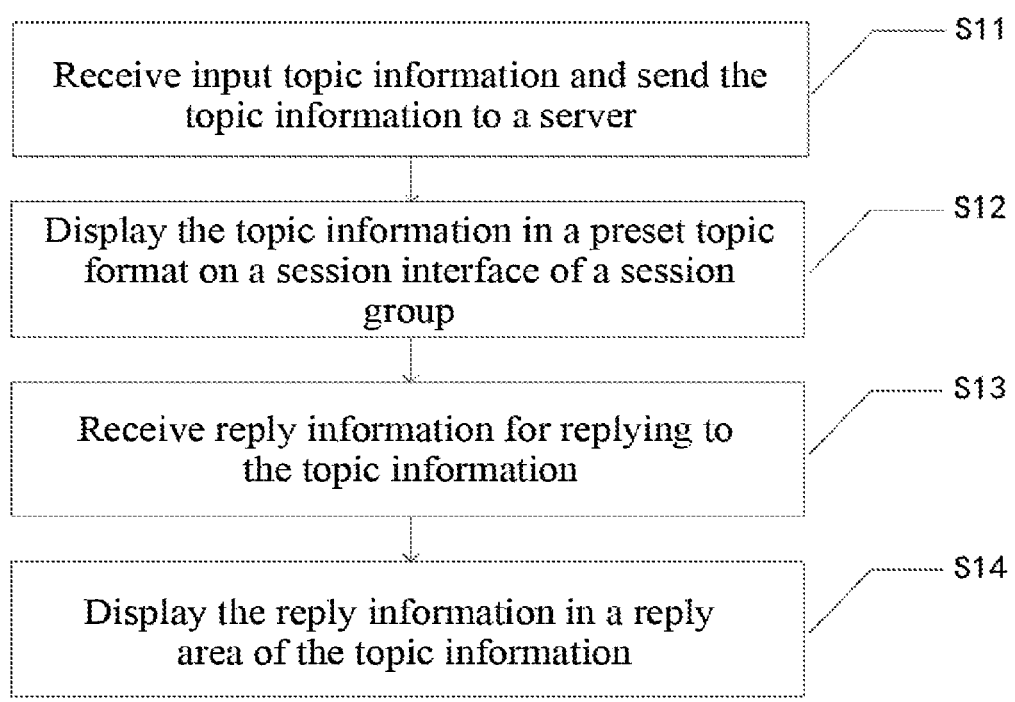
FIG. 1 is a flowchart of an information processing method according to an embodiment of the present disclosure.

Embodiments of the present disclosure will be described in greater detail below with reference to the accompanying drawings. While certain embodiments of the present disclosure are shown in the accompanying drawings, it should be understood that the present disclosure may be implemented in various forms and should not be construed as being limited to the embodiments set forth herein, but instead are provided for a more thorough and complete understanding of the present disclosure. It should be understood that the accompanying drawings and embodiments of the present disclosure are for exemplary purposes only and are not intended to limit the scope of protection of the present disclosure.

It should be understood that the individual steps documented in the method embodiments of the present disclosure may be performed in sequence and/or in parallel. In addition, the method embodiments may include additional steps and/or omit to perform the steps illustrated. The scope of the present disclosure is not limited in this regard.

The term "includes" and variations thereof as used herein are open-ended, i.e., "includes but is not limited to". The term "based on" is "based, at least in part, on". The term "an embodiment" means "at least one embodiment"; the term "another embodiment" means "at least one additional embodiment"; the term "some embodiments" means "at least some embodiments". Definitions of other terms will be given in the description below.

It should be noted that the concepts of "first" and "second" mentioned in this disclosure are used only to distinguish between different devices, modules or units, and are not intended to define the order or interdependence of the functions performed by these devices, modules or units.

It should be noted that the modification "one" referred to in this disclosure is illustrative rather than limiting, and it should be understood by those skilled in the art to mean "one or more" unless the context clearly indicates otherwise.

The names of the messages or information interacted between the plurality of devices in this implementation of the disclosure are used for illustrative purposes only and are not intended to limit the scope of those messages or information.

The solution provided by the embodiments of this application will be described in detail below in conjunction with the accompanying drawings.

In related technologies, a user sends and receives communication information on a session interface when communicating with other users in instant messaging software, where the communication information is displayed in chronological order of sending and receiving. When the user desires to search for communication information of interest, the user needs to scroll up the communication information piece by piece, resulting in poor user experience. Especially in group chats, many users participate in a session, and many communication messages are sent. It takes a lot of time and effort to find communication messages of interest from numerous communication messages.

Some embodiments of the present disclosure provide an information processing method, which may be used for an instant messaging client. As shown in FIG. 1, which is a flowchart of an information processing method according to some embodiments of the present disclosure, the information processing method includes the following steps S11-S14.

S11: Receive input topic information and send the topic information to a server.

In some embodiments, the input topic information received by the client may be communication information input through an information input box of a session interface of the instant messaging client. Because the topic information is not posted on a separate topic posting page, a user's habit of posting a communication message in an instant messaging scenario will not be changed and can be better fused with the instant messaging scenario, resulting in high communication efficiency. By inputting the communication information in the information input box of the session interface, the client directly posts the communication information as topic information without any other operation. In other embodiments, with reference to FIG. 2, a topic creation identifier (marked by a circled pen at the bottom right corner in FIG. 2) is set on the session interface, a topic input box is displayed after the topic creation identifier is triggered, many forms of information such as text, images, and videos may be input in the topic input box, and the information input in the topic input box is sent to form topic information.

After receiving the topic information, the client needs to send the topic information to other users who are communicating with the current user. For example, when the current user is chatting in a group, the topic information input by the client needs to be sent to other users in the group. Therefore, the client sends the topic information to the server, so that the other users who are chatting with the current user receive the topic information.

In some embodiments, two types of communication information can be input in the session interface of the client, one is topic information, and the other is reply information to any topic information. If the current user chooses to reply to any existing topic information when inputting communication information, the input communication information is reply information. If the user does not choose to reply to any existing topic information when inputting communication information, the input communication information is topic information.

S12: Display the topic information in a preset topic format on a session interface of a session group.

In some embodiments, the session group refers to a user group constituted by a current user and users who make a session with the current user. If the current user is making a one-to-one session with another user, the current user and another user constitute a session group. If the current user is chatting in a user group, users in the whole user group constitute a session group. The session interface of the session group refers to an interface used to send instant messaging information, and is also known as a chat interface in related technologies. In some embodiments, the preset topic format is set for the topic information, and the preset topic format has a reply area, which may be used to display reply information about the topic information. The preset topic format may be, for example, a topic card.

S13: Receive reply information used to reply to the topic information.

Figure 2:
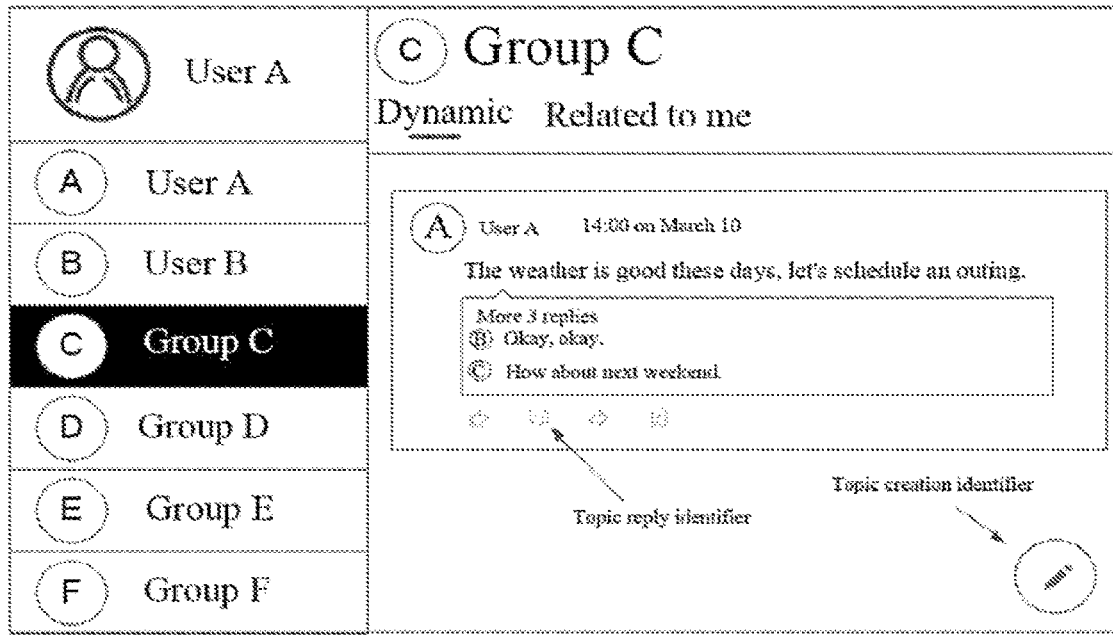
FIG. 2 is a schematic diagram showing that a client displays a topic creation identifier according to an embodiment of the present disclosure.
Figure 3:
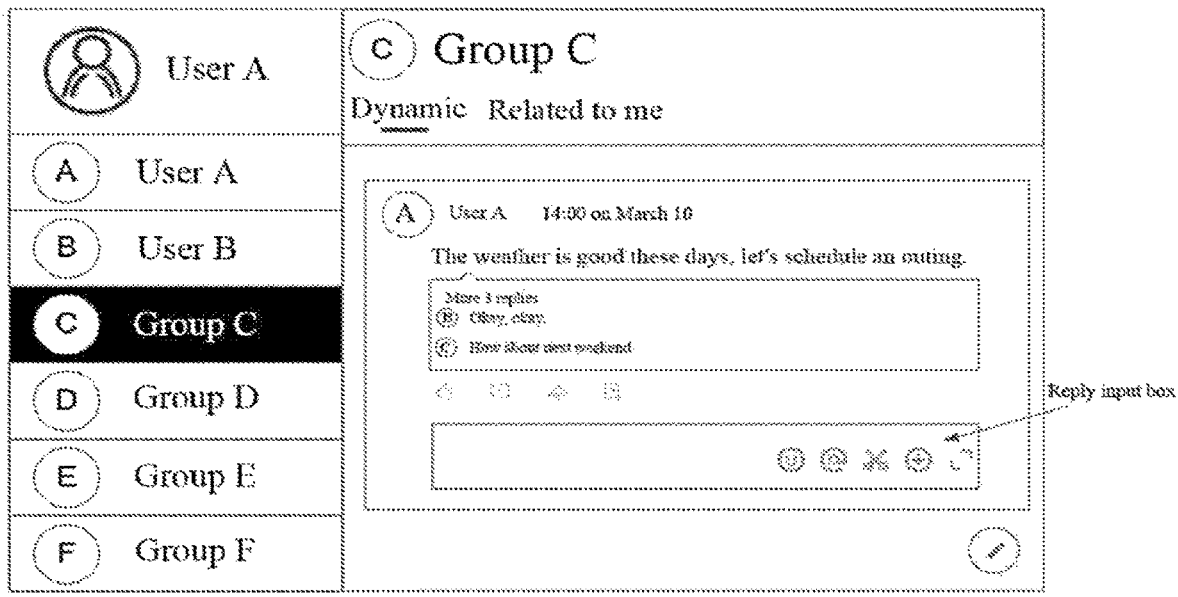
FIG. 3 is a schematic diagram showing that a client displays a reply input box according to an embodiment of the present disclosure.

In some embodiments, after the topic information is posted in the session interface, users in the session group may be interested in the topic information and give replies, and the reply information is sent when replying. In some embodiments, the receiving reply information used to reply to the topic information includes: receiving the input reply information and sending the reply information to the server, or receiving the reply information from the server. The reply information may be reply information input in the input box of the session interface of the client, or other users send reply information to the server after replying to the topic information, and then the client receives the reply information sent by the other users from the server. In some embodiments, the preset topic format has a reply identifier, and a reply input box is displayed in the preset format after the reply identifier is triggered, where the reply input box is used to input the reply information. As shown in FIG. 2, the area where the topic information is located displays the reply identifier. After the reply identifier is triggered, the reply input box is displayed as shown in FIG. 3, and the reply information is input in the reply input box.

S14: Display the reply information in a reply area of the topic information.

In some embodiments, the preset topic format has a reply area, and all replies to the topic information are displayed in the reply area. In this case, any topic information and reply information related to the topic information are uniformly displayed together. When a user desires to search for information of interest, the user only needs to search for the topic information of interest. All reply information is displayed in the reply area under the topic information of interest, users do not need to do a lot of search, which improves users' search efficiency and user experience.

In some embodiments of the present disclosure, in the session interface of the instant messaging client, users may directly post topic information and reply to the topic information. All communication information is displayed in forms of topic information and reply information in the session interface, making it convenient for the users to search and view information of interest to improve user experience.

Figure 4:
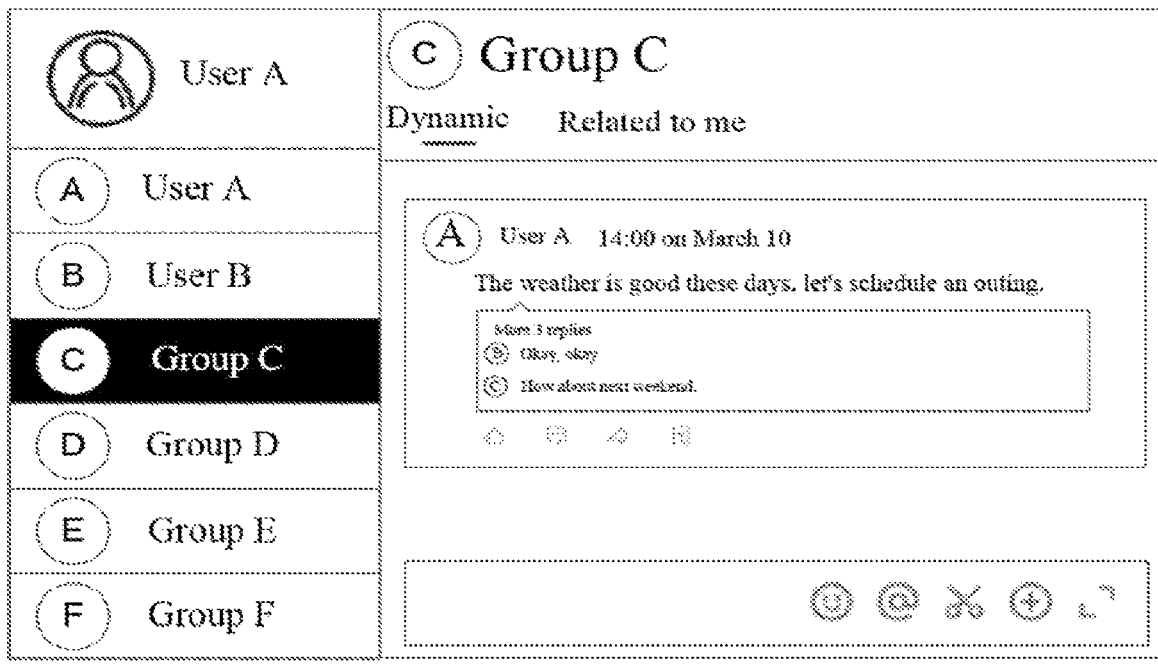
FIG. 4 is a schematic diagram showing that a client displays a first sub-interface of a session interface according to an embodiment of the present disclosure.

In order to better illustrate the method provided in the present disclosure, an instant information processing method provided in some embodiments of the present disclosure is explained below with reference to FIG. 4. FIG. 4 shows a user interface of an instant messaging client. As shown in FIG. 4, one side of the client displays a contact list, including individual users and groups. In this embodiment, session group C is used as an example. After group C is selected in the contact list, a session interface of group C is displayed in a display interface of the client, and an input box is displayed in the session interface of group C. In some embodiments, all communication information is displayed in forms of topic information and reply information in the session interface. If existing topic information has been displayed in the session interface, and a reply identifier of any topic information is clicked before inputting information in the input box, the information input in the input box is reply information. If a reply identifier of any topic information is not clicked before inputting communication information in the input box, the input information is topic information. By inputting topic information in the input box and posting the topic information, the client receives the topic information inputted and posted through the input box, and sends the topic information to the server, so that the server may forward the topic information to other users in the session group, where the topic information is displayed in a preset topic format, and the preset topic format has a reply area. After reply information is received, the reply information is displayed in the reply area. In some embodiments, refer to FIG. 2, where a reply identifier is displayed under the topic information. After the reply identifier is triggered, as shown in FIG. 3, a reply input box is displayed in the preset format where the topic information is located, and the reply information about the topic information is input in the reply input box. The reply information is indicative of "Okay, okay" and "How about next weekend" in FIG. 4. As shown in FIG. 4, the topic information in FIG. 4 is displayed in a form of a topic card. The topic information and the reply information are located inside the topic card. When a user is interested in any topic information, the user may view all reply information by viewing any topic card, thereby improving user experience. In related technologies, information is arranged in chronological order, and information corresponding to the same topic is distributed in different locations. When a user searches for information of interest, the user needs to search for historical information, resulting in low user experience.

In some embodiments of the present disclosure, the preset topic format includes a topic display area, a reply area, and a topic related area: the topic related area includes at least one of a topic creator area, a topic creation time area, and a topic name area. In some embodiments, the topic information is displayed in the preset topic format, where the topic information is displayed in the topic display area of the preset topic format, the reply information is displayed in the reply area, an identifier of the user who created the topic is displayed in the topic creator area, the topic creation time area is used to display creation time of the topic, and the topic name area is used to display a name of the topic. For example, refer to FIG. 4. In FIG. 4, the displayed topic is created by user A, the name and avatar of user A are displayed in the topic creator area, and the topic information "The weather is good these days, let's schedule an outing" is displayed in the topic display area. In FIG. 4, "14:00 on March 10" is the topic creation time displayed in the topic creation time area. In FIG. 4, "Okay, okay" and "How about next weekend" are reply information, and the area where the reply information is located is the reply area. The name of the topic is not displayed in FIG. 4. When topic information is created, the topic information may be set and the name of the topic may be displayed.

In some embodiments of the present disclosure, when the number of reply information in the reply area exceeds a preset number or the space occupied by the reply information reaches a preset threshold, the reply area is folded and an unfolding identifier is displayed, where the unfolding identifier is used to unfold the reply area. In some embodiments, as shown in FIG. 4, the preset number is 2. When the number of reply information exceeds 2, the reply area is folded. In other embodiments, whether the reply area is folded is determined according to the space occupied by the reply information. The total number of rows or total height occupied by the reply information may be used to represent the space occupied by the reply information. For example, the reply area is folded when the total number of rows occupied by the reply information in the reply area reaches a preset number of rows, or when the total height of the reply information in the reply area reaches a preset height. The folded reply area may display only the earliest posted preset number of reply information, or display only the latest posted preset number of reply information, or display a preset number of reply information with the highest popularity. There may be many methods for determining the popularity of reply information, for example, the popularity of reply information is determined according to the number of times that the reply information is cited or liked. The more times the reply information is cited or liked, the higher the popularity. In other embodiments, the creator of the topic information may alternatively specify the preset number of reply information, and the folded reply area displays only the specified reply information and folds other reply information. The unfolding identifier is displayed after the reply area is folded, the reply area is unfolded after the unfolding identifier is triggered, and the unfolding identifier may display the number of folded reply information. "More 3 replies" shown in FIG. 4 is an optional unfolding identifier, showing that 3 pieces of reply information are folded. By folding the reply information, excessive reply information may be prevented from causing inconvenience to users when searching for information of interest, and users may quickly search for information of interest.

Figure 5:
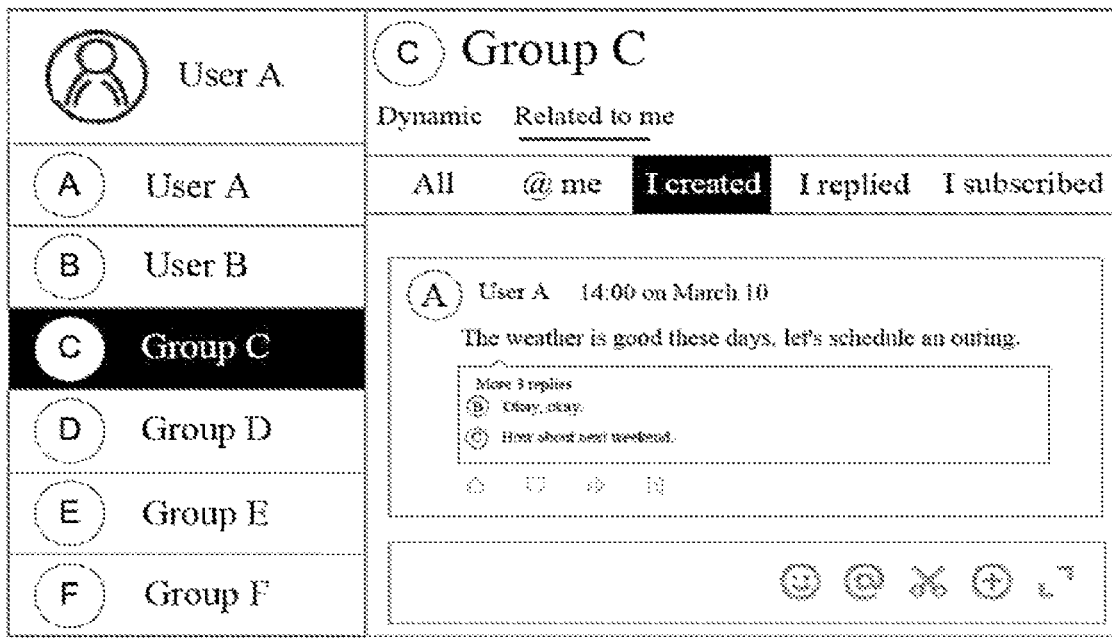
FIG. 5 is a schematic diagram showing that a client displays a second sub-interface of a session interface according to an embodiment of the present disclosure.

In some embodiments of the present disclosure, the session interface includes a first sub-interface and a second sub-interface; the first sub-interface is used to display all topic information of the session group; and the second sub-interface is used to display topic information related to a current user. In some embodiments, reference may be made to FIG. 4 and FIG. 5. The session interface of group C in FIG. 4 is divided into two sub-interfaces: "Dynamic" and "Related to me". The "Dynamic" interface as the first sub-interface displays each piece of topic information and reply information under the topic information. The "Related to me" interface as the second sub-interface displays topic information related to the current user, where the current user refers to an account logged in to the client, and in FIG. 4, the current user is "User A". In some embodiments, by setting the first sub-interface and the second sub-interface, the current user can not only view all the topic information in the first sub-interface, but also quickly view the topic information related to the current user in the second sub-interface, thereby improving search speed and user experience.

In some embodiments of the present disclosure, at least one type identifier is displayed in the second sub-interface; and after any type identifier is triggered, topic information associated with the triggered type identifier in the related topic information is displayed. In some embodiments, the user related topic information may be divided into different types, and each piece of the user related topic information is associated with at least one type. By setting type identifiers on the second sub-interface, related topic information may be filtered by triggering a type identifier to quickly display the topic information associated with the triggered type identifier.

In some embodiments of the present disclosure, the type identifier includes at least one of the following: all related topic information, user created topic information, user replied topic information, user subscribed topic information, and topic information sent to users as reminders. In some embodiments, after all the related topic information is triggered, all the related topic information is displayed in the second sub-interface. In some embodiments, a user may subscribe to any topic information, and the subscribed topic information is the user subscribed topic information. In some embodiments, when the topic information is posted and replied, a reminder may be sent to one or more users to remind the users to view the topic information or the reply information. The topic information that sends reminders to the users is the topic information sent to users as reminders. The reminder may be sent to remind a specified user in a form of "@user name" when sending the topic information or the reply information.

In some embodiments of the present disclosure, custom type identifiers, including at least two of the type identifiers, are further displayed in the second sub-interface. After the custom type identifiers are triggered, the topic information associated with each type identifier in the custom type identifiers is displayed in the second sub-interface. For example, refer to FIG. 5, where custom type identifiers may be added. Two type identifiers "I created" and "I replied" in FIG. 5 may be set as custom type identifiers. After the custom type identifiers are triggered, the topic information associated with the two type identifiers "I created" and "I replied" is displayed. By setting the custom type identifiers, the topic information associated with a plurality of specified type identifiers may be displayed once, so that users view their most concerned topic information more quickly.

Figure 6:
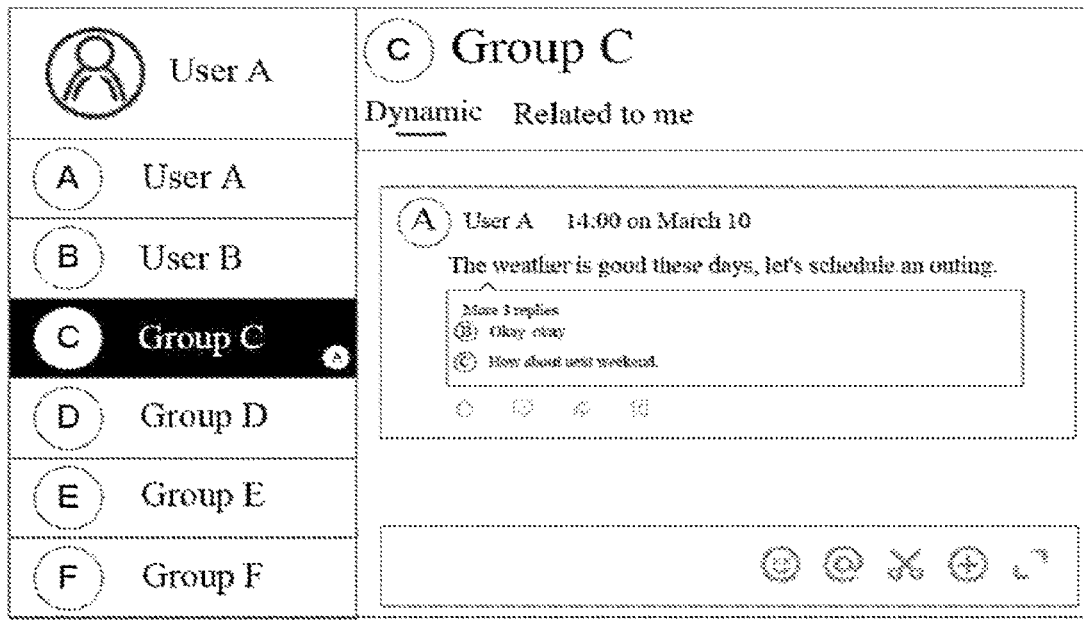
FIG. 6 is a display diagram of a client when receiving reminder information according to an embodiment of the present disclosure.

In some embodiments of the present disclosure, reminder information sent by any other user in the session group to the current user is received, and an identity of the user who sent the reminder information is displayed at a preset position of the session interface. In some embodiments, the preset position is, for example, a session entrance of the session interface. The session entrance of the session interface may be, for example, an area corresponding to the session group in the contact list or an area corresponding to a session group in a recent session list. For example, refer to FIG. 4 and FIG. 6, where user A as the current user is a member of group C in FIG. 4. If user A is also a member of group C, and user A sends reminder information to user A as the current user in FIG. 4 when posting a topic, for example, @user A when posting topic information, the identity of user A is displayed at the session entrance of the session interface. For example, as shown in FIG. 6, the display interface of the client displays a recent contact list, the area corresponding to group C in the recent contact list is the session entrance of the session interface of group C, and the avatar of user A is displayed in the area corresponding to group C, where the avatar of user A is used as the identity of user A. In related technologies, after a reminder sent from another user to the current user is received, only reminder information is displayed, while an identity of the user who sent the reminder is not displayed. As a result, the current user fails to directly determine the identity of the sender and needs to click on the reminder to view, causing inconvenience. In some embodiments of the present disclosure, the identity of the user who sent the reminder is displayed to facilitate user's quick determination on the identity.

In some embodiments of the present disclosure, the session interface of the session group may be a single chat interface between two users, such as a one-to-one session interface between the current user and another user. In other embodiments of the present disclosure, the session interface of the session group may be a group chat interface of any user group.

In some embodiments of the present disclosure, types of the user group include a topic group and a chat group; a group chat interface of the topic group is used to post topic information and reply information for replying to the topic information; a group chat interface of the chat group is used to post non-topic information; and the session interface of the session group is the chat interface of the topic group. In some embodiments, the user group includes two different types. Communication information may be displayed in forms of topic information and reply information in the group chat interface of the topic group, and communication information may not be topic information in the group chat interface of the chat group. In this case, when a user desires to post topic information, a topic group is established to post the topic information, and when the user desires to engage in a normal chat behavior, a chat group is established. This achieves specific establishment of different types of user groups.

In some embodiments of the present disclosure, types of the user group include a topic group and a chat group; a group chat interface of the topic group is used to post topic information and reply information for replying to the topic information; and a group chat interface of the chat group is used to post topic information, reply information for replying to the topic information, and non-topic information. In some embodiments, the topic group can post only topic information and reply information, and the chat group may post topic information, reply information, and non-topic information. In this case, the session interface of the session group may be either the chat interface of the topic group or the group chat interface of the chat group. When the chat group may post topic information, reply information, and non-topic information, users' flexible information exchange requirements may be met. For example, the chat group may send instant messages without specific topic attributes, and relatively casual chats. Alternatively, when a specific topic needs to be discussed, a topic interface is created, and subsequent chat information related to the topic is gathered in the topic interface, so that users in the group quickly find information related to the topic. A folding mechanism and the like based on the reply information on the topic interface may also save display space. When interactive information related to the topic needs to be learned in detail, a detail interface of the topic is entered, thereby improving overall information display and obtaining efficiency.

In some embodiments, the session interface corresponds to a corresponding group in a session entry interface. For example, generally, a group is first created and displayed in the session entry interface. As shown in FIG. 3, group C is displayed in the session entry interface. The information processing method further includes: defaulting a second user outside the group to join the group or join the topic when a first user in the group associates the second user with the topic information. For example, there are users A, B, and C in group C. For a topic posted by A, if the first user B@a user D outside group C, it may be considered that B associates D with the topic. In this case, it may be defaulted that the second user D has joined group C or joined the topic information. For the topic information, when interaction with users outside the session interface is required, the interaction may be directly performed by means of @, which saves an operation of adding user D to the group and facilitates the interaction between the users and the topic information. In some embodiments, the second user may be defaulted to join the group or join the topic information, or a switch button is set and the second user joins the group or joins the topic information when the switch button is turned on and the first user in the group associates the second user outside the group with the topic information. In some embodiments, in order to better protect the privacy of users in the original group (such as group C), the second user may be set to see only the reply information of the user@him, but not to see the reply information of other users in the topic information, or to see only the information after the second user is defaulted to join the group or the topic information, but not to see the reply information about the topic information before joining.

In some embodiments, the method further includes: when the topic information is public, in response to forwarding the topic information, displaying interactive information related to the topic information in the forwarded topic information. That is, when the posted topic information is public, forwarding the topic information may display interactive information related to the topic information, such as likes and replies. This setting facilitates users' forwarding operations. When the topic information is private, in response to forwarding the topic information, the information displayed in the forwarded topic information is less than the information displayed in the topic information before forwarding. In some embodiments, in order to protect users' privacy, when the user on the session interface corresponding to the topic information forwards the topic information to another session group, the interactive information about the forwarded topic information is visible to only the users in the original group and the forwarded group, and invisible to other users, so as to better protect users' privacy information.

In some embodiments, when the posted topic information is private, in response to forwarding the topic information, the information displayed in the forwarded topic information is less than the information displayed in the topic information before forwarding. Because the attribute setting of the topic information is private, the poster does not desire to make the topic information public. Therefore, the privacy of the interactive information for the topic information may also be protected by displaying less information in the forwarded topic information, for example, displaying only the topic information, rather than displaying the reply information about the topic information.

In some embodiments, the method further includes: in response to a preset operation, initiating a session invitation for participants of the topic information, or creating a session or a communication group based on participants of the topic information. In some embodiments, the first topic interface may have a session invitation button. When the button is triggered (preset operation), a session invitation may be initiated for participants (such as posters and responders) in the topic to further communicate on the topic within the session. In this case, interaction on the topic is facilitated. A session creation button or a group creation button may alternatively be provided. After the session creation button is triggered, a session is created based on the participants of the topic information (such as posters of the topic information and posters of the reply information). After the group creation button is triggered, a group is created and the participants of the topic information are added to the group.

Figure 7:
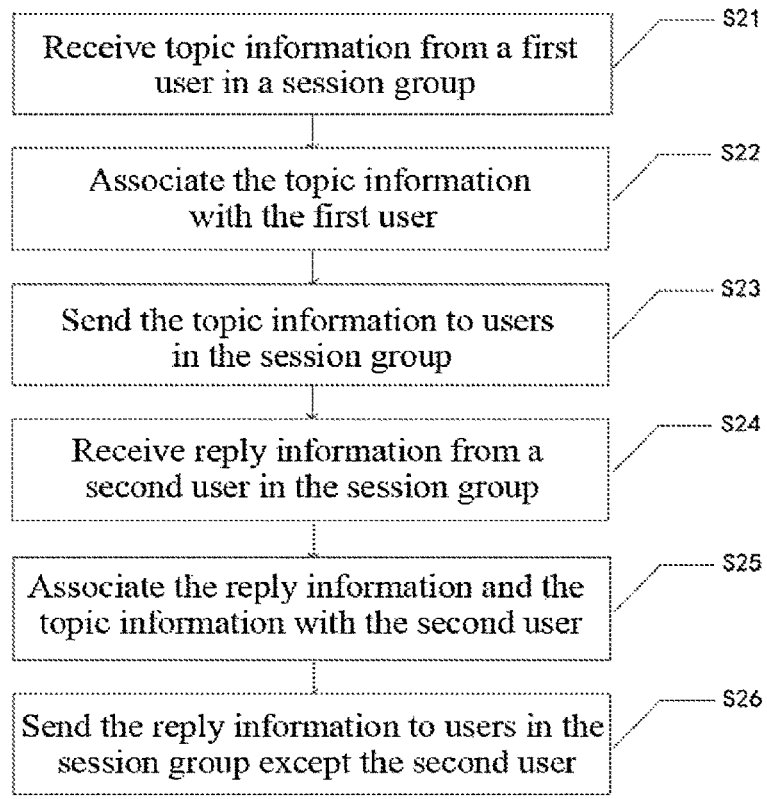
FIG. 7 is a flowchart of a control method for a server according to an embodiment of the present disclosure.

In some embodiments of the present disclosure, a control method for a server is further provided. The server may be the server in any of the foregoing embodiments. With reference to FIG. 7, the control method for a server in some embodiments of the present disclosure includes:

S21: Receive topic information from a first user in a session group.

In some embodiments, the first user in the session group sends the topic information through the instant messaging client in any of the foregoing embodiments. The first user may be any user in the session group, and the topic information is created by the first user. The number of users in the session group may be two or more.

S22: Associate the topic information with the first user.

In some embodiments, a mapping relationship between the first user and the topic information is established in the server.

S23: Send the topic information to users in the session group.

In some embodiments, the first user creates the topic information, so the server does not need to send the topic information to the first user. The server sends the topic information to other users in the session group, so that the users in the session group display the topic information on a session interface of the session group. In other embodiments, the server sends the topic information created by the first user to all users in the session group.

S24: Receive reply information from a second user in the session group.

In some embodiments, the reply information is used to reply to the topic information.

S25: Associate the reply information and the topic information with the second user.

In some embodiments, the second user may be any user in the session group, or a user in a specified user group in the session group. In some embodiments, the topic information may be a topic that all users in the session group may participate in, so the second user may be any user in the session group. In other embodiments, the topic information requires some users to participate, while other users may optionally or cannot participate, so the second user may be the user in the specified user group in the session group. The second user may be set as the user in the specified group, the specified group may be a group specified by the topic information, users participating in the topic information may be specified when the topic information is created, and these specified users form the specified user group. In some embodiments, the second user participates in the topic information, so the second user is associated with the topic information; and because the reply information is created by the second user, the second user is associated with the reply information.

S26: Send the reply information to users in the session group except the second user.

In some embodiments, the reply information is sent to all users in the session group. In other embodiments, the reply information is sent to the users in the session group except the second user. By sending the reply information, each user in the session group updates the topic information, thereby displaying the reply information in a reply area of the topic information. In some embodiments, the topic information is displayed in a preset format in the session interface of the session group, and the reply information is displayed in the reply area of the preset format.

In some embodiments of the present disclosure, by establishing the association of the topic information with the first user and the association of the second user with the topic information and the reply information, users associated with the topic information may be quickly found, which facilitates sending of reminders to the users associated with the topic information.

In some embodiments, the control method for a server further includes: associating the session group with the topic information. In some embodiments, the topic information is created by a member in the session group and displayed in the display interface of the session group, so the topic information is bound to the session group and the associated topic information may be quickly found through the session group.

In other embodiments of the present disclosure, the control method for a server further includes: receiving an obtaining request from a third user in the session group; obtaining target topic information associated with the third user; and sending the target topic information to the third user to display the target topic information in a client of the third user. In some embodiments, the obtaining request is used to obtain the topic information, and the target topic information associated with the third user may be, for example, topic information replied by the third user, topic information posted by the third user, topic information subscribed by the third user, or topic information with reminder information sent to the third user. In this case, the server may obtain the topic information associated with the third user according to an identity of the third user and send the associated topic information to the third user, and the reply information in the topic information may be sent to the third user together.

In some embodiments of the present disclosure, an information processing method is further provided, including:

obtaining topic information posted in a session group by a first user in the session group;

recording an association relationship between the topic information and the session group, and recording an association relationship between the first user and the topic information; or obtaining a preset action performed by a second user in the session group on the topic information, recording the preset action, and recording an association relationship between the second user and the preset action; or obtaining reply information about the topic information, and recording the reply information and an association relationship between the topic information and the reply information; and in response to receiving an information obtaining request, filtering, based on a target identifier corresponding to the information obtaining request, the topic information associated with the target identifier, and returning the filtered topic information, where the target identifier includes one or more of a session group identifier, a user identifier, and a topic identifier.

In some embodiments, the information processing method may be used for the foregoing instant messaging client or for the foregoing server cooperating with the instant messaging client. The first user may be any user in the session group or a user in the session group who has been granted permission to post topics. After the first user posts the topic information, the association relationship between the first user and the topic information is recorded, and the association relationship between the topic information and the session group is also recorded. By associating the topic information with a poster of the topic information and the session group, topic information associated with the topic group and user associated topic information may be quickly found. In some embodiments, the association relationships may be recorded through relationship tables, where the association relationship between the session group and the topic information may be recorded through a session group and topic relationship table, and the association relationship between each user and each piece of topic information may be recorded through a user and topic relationship table. In other embodiments of the present disclosure, the control method further includes recording an association relationship between the session group and users in the session group. For example, the association relationship between the session group and the users in the session group is recorded through a session group and user relationship table. In some embodiments of the present disclosure, the preset action may be, for example, a reply action, a subscription action, or a reminder action. After the user performs the preset action such as reply and subscription on the topic information, the executed preset action is recorded and the association relationship between the second user and the preset action is recorded. If the second user and the topic information are not associated, the association relationship between the second user and the topic information may alternatively be established. If the second user and the topic information have been associated, the association relationship between the preset action and the second user is additionally recorded. In some embodiments, the association relationships between each user and each topic and between each user and the performed preset action may be recorded through the user and topic relationship table. In some embodiments of the present disclosure, the association relationship between the topic information and the reply information is recorded through a topic and message relationship table, where the reply information may be, for example, text, images, emotions, and likes. By analyzing the association relationship between the topic information and the reply information, reply information associated with the topic information is quickly inquired.

In some embodiments of the present disclosure, the target identifier may be carried in the information obtaining request. The target identifier is obtained from the information obtaining request, or obtained from other sources, which is not limited. In some embodiments, after a preset control is triggered, the target identifier corresponding to the preset control is obtained, so as to obtain the topic information corresponding to the target identifier, where the target identifier may be a type identifier corresponding to the preset control, and the topic information corresponding to the target identifier may be topic information of a type specified by the current user in the session group corresponding to the preset control. For example, the preset control may be a control corresponding to "I created" in FIG. 5, and the target identifier may be a type identifier "I created". After the control is triggered, the topic information of the type "I created" specified by the current user (user A) in the session group (group C) corresponding to the control is obtained.

Figure 8:
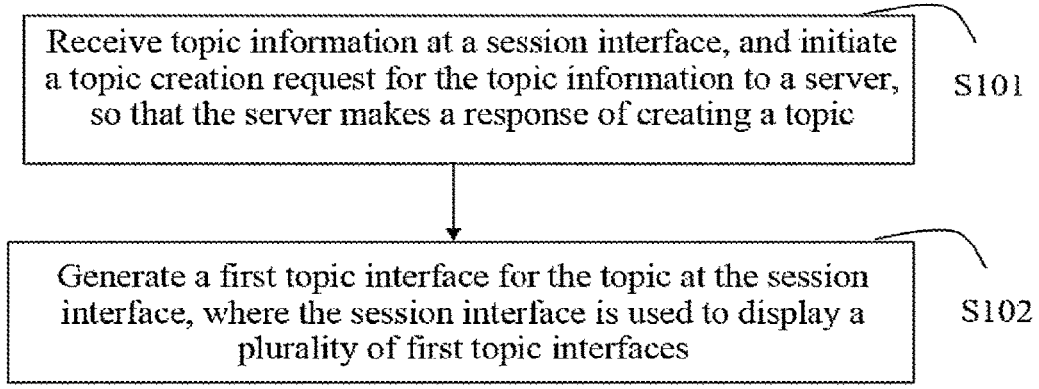
FIG. 8 is a flowchart of an information processing method according to an embodiment of the present disclosure.

FIG. 8 provides a flowchart of an information processing method according to an embodiment of the present disclosure. In some embodiments, the information processing method in the present disclosure includes step S101: receiving topic information at a session interface of an instant messaging client, and initiating a topic creation request for the topic information to a server, so that the server makes a response of creating a topic. In some embodiments, the session interface may be a session interface of an instant messaging application, such as a chat session interface of a user group. The instant messaging client described in the embodiment of the present disclosure may be a client that needs to download an installation package for installation or a web application. In some embodiments, there may be a button for initiating a topic at the session interface. When the button is triggered, topic information may be input, and then the topic information may be received at the session interface. After receiving the topic information at the session interface, the client of the application may initiate the topic creation request for the topic information to the server, and then the server creates a topic in response to the request. In some embodiments, the server refers to a server of an application corresponding to the client.

In some embodiments, the information processing method in the present disclosure includes step S102: generating a first topic interface for the topic at the session interface. In some embodiments, after the topic is created, the first topic interface for the topic is generated or displayed at the session interface to complete creation of the topic. In some embodiments, a plurality of first topic interfaces may be displayed at the session interface. In some embodiments, a topic of interest in the first topic interface may be viewed through a preset operation (for example, a sliding operation) at the session interface.

In the embodiment of the present disclosure, the first topic interface is generated at the session interface, so that a user may participate in the topic of interest based on his interest. By joining or participating in the topic, content related to the topic that the user participates in is more concentrated, which facilitates communication, enables the user to find the content related to the user, and prevents the content of interest in, for example, a group chat session interface from being covered by mass unrelated information.

Figure 9:
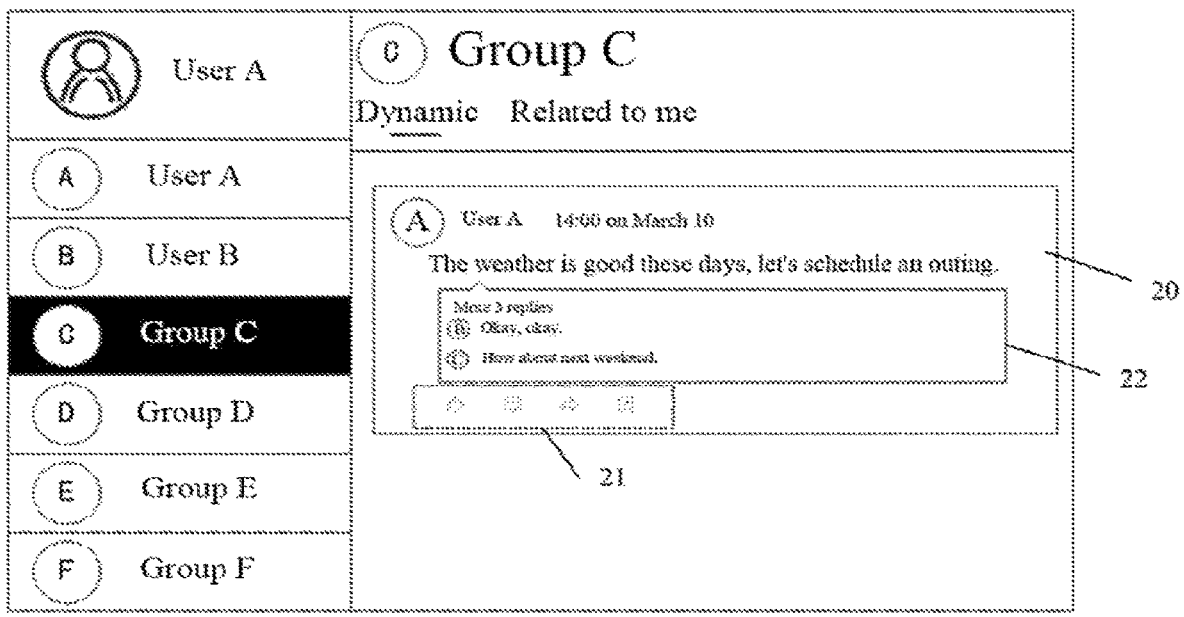
FIG. 9 is a schematic diagram of a topic interface according to an embodiment of the present disclosure.

In some embodiments, the information processing method in the present disclosure further includes: displaying preset quick reply items on the first topic interface. As shown in FIG. 9, dashed box 21 in FIG. 9 shows exemplary preset quick reply items, such as likes, quick comments, and quick forwarding. It should be understood that FIG. 9 is merely illustrative and not intended for limitation. In some embodiments, the first topic interface further displays quantities of operations for the preset quick reply items. For example, for 6 likes, the number "6" may be displayed near a like identifier. By displaying the preset shortcut reply items on the first topic interface 20, interaction of the topic on the first topic interface displayed at the session interface is more convenient. Other users may immediately perform corresponding likes, replies, and the like after seeing the topic posted by the poster.

In some embodiments, the first topic interface 20 further includes a reply display area for displaying reply information specific to the topic. FIG. 9 illustrates an exemplary reply display area 22. By displaying the reply information specific to the topic on the first topic interface, content related to the topic can be viewed more conveniently. Compared with existing group chats, information replying to the topic is prevented from being overwhelmed in mass unrelated group chat information.

In some embodiments, the reply display area 22 displays some reply information and summary information of all the reply information, or summary information of reply information that is not displayed in the reply display area. In some embodiments, the reply display area 22 may display the summary information of all the reply information, so that the poster or other users may clearly understand the discussion heat or attention level of the topic and the like. In some embodiments, the reply display area 22 may display the summary information of the reply information that is not displayed in the reply display area. For example, as shown in FIG. 9, "More 3 replies" is the summary information of the reply information that is not displayed. When the user performs a preset operation (such as click), the user may see specific content of the summary information, namely, hidden reply information. By hiding some reply information, the display space of the topic interface may be saved, which is conducive to compact display of the topic interface. In some embodiments, the displayed reply information is reply information most relevant to a logged user, such as information@the user or a reply to user's related content (such as reply information).

In some embodiments, the some reply information includes a preset quantity of reply information, or reply information occupying a preset display space. In some embodiments, the preset display space includes a preset display height. By displaying the preset quantity of reply information or the reply information occupying the preset display space, the display space of the first topic interface may be saved, which is conducive to compact display of the first topic interface. Consequently, more first topic interfaces are displayed at the session interface, and users quickly capture topics of interest. In some embodiments, the summary information includes one or more of the following: a total quantity of all the reply information, a quantity of the reply information that is not displayed, and sender identifiers of reply information that satisfies preset conditions. The summary information includes the total quantity of all reply information, so that the poster and other topic participants understand the discussion heat of the topic. The summary information includes the quantity of reply information that is not displayed, which may be used to remind participants of a quantity of non-viewed reply information. In some embodiments, the reply information that satisfies the preset conditions includes information@me, information of replying to me, and the like. In some embodiments, the sender identifiers may include avatars and/or user names and the like of senders. In some embodiments, the preset quantity of reply information includes a preset quantity of emotions. The preset quantity may be, for example, three. The three emotions may be determined in chronological order or determined according to a quantity of corresponding emotions. In some embodiments, the quick reply emotion items display corresponding emotions and corresponding quantities, instead of avatars or user names of users of reply emotions.

Figure 10:
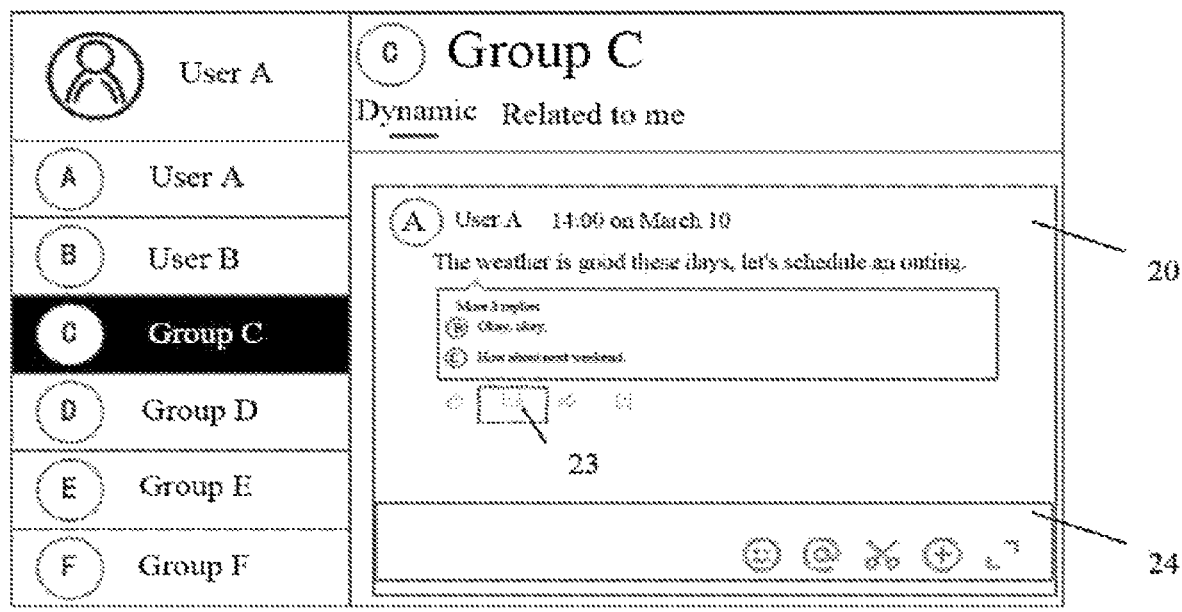
FIG. 10 is a schematic diagram of a topic interface according to another embodiment of the present disclosure.

In some embodiments, the first topic interface includes a reply area for receiving a reply trigger operation; displaying a first reply input area in response to receiving the reply trigger operation; receiving reply content input in the first reply input area; and sending the received reply content in response to receiving a sending instruction. For example, as shown in FIG. 10, a reply trigger button 23 in the reply area is schematically shown. A first reply input area 24 is displayed in response to receiving a reply trigger operation (such as click) on the reply trigger button 23, reply content may be received in the first reply input area 24, and then the input reply content is sent out upon receiving a sending instruction. Therefore, when the reply content is not used, the display space of the first topic interface may be more compact. When the reply related content is needed, the corresponding reply trigger operation is performed, which not only facilitates interactive operations of replies, but also saves the display space of the first topic interface. The first reply area may be displayed at a lower edge of the first topic interface, so that the user confirms that the content replied in the reply area is specific to the first topic interface. In addition, after the reply information is sent out, the first reply area may be folded up to further save the display space.

In some embodiments, the information processing method in the present disclosure further includes: in response to receiving a trigger operation of entering a topic, displaying a second topic interface corresponding to the trigger operation, where the second topic interface displays topic information of the corresponding topic, reply information about the topic, and a second reply input area. That is, the second topic interface that displays the topic of interest to the user may be entered from the session interface that displays a plurality of first topic interfaces, where the second topic interface displays more detailed information related to the topic. In some embodiments, the user may input corresponding reply information in the second reply input area, and the client receives reply content input in the second reply input area, and then sends the received reply content in response to receiving a sending instruction. In some embodiments, the session interface may be a more compact interface that displays a plurality of first topic interfaces, and the second topic interface may be a detailed topic interface of the specific first topic interface of interest to the user.

In some embodiments, the second topic interface covers the session interface. In some embodiments, the display area of the second topic interface may be the same as the display area of the session interface, but the session interface may display a plurality of first topic interfaces, so the display space of each first topic interface is more compact, and the second topic interface may display more detailed information about the topic specific to the first topic interface. In some embodiments, the second topic interface displays a return control for returning to the session interface upon receiving a return trigger operation. That is, a user may enter the second topic interface from the first topic interface of the session interface, for example, click on the first topic interface of a topic in the session interface to access the second topic interface of the topic. In addition, the user may also return to the session interface from the second topic interface, thereby achieving smooth interaction between the session interface and the second topic interface.

In some embodiments, the second topic interface displays all reply information about the topic. As mentioned above, the second topic interface may display more detailed content of the corresponding topic, such as all reply information. Therefore, when a user desires to know more information about the topic, the user may enter the second topic interface from the first topic interface to implement more detailed topic interaction and learn more interactive information about the topic.

In some embodiments, input controls in the first reply input area are fewer than those in the second reply input area. In some embodiments, because the first topic interface displayed in the session interface is a more compact interface, only some input controls may be displayed, for example, setting only some emotion items or user prompt controls. After the user enters the second topic interface, there may be more or even all input controls, such as a file sending control, which may also help implement more detailed and sufficient interaction in the second topic interface.

In some embodiments, after the second topic interface is displayed, quick reply items are unfolded and displayed, for example, tiled, but the present disclosure is not limited thereto. In some embodiments, the unfolded display may display all emotion reply items, or display more emotion reply items than the summary information. More reply items and corresponding detailed information may be displayed through the unfolded display. In some embodiments, a user name and/or a user avatar of a user who replied to a corresponding emotion are displayed next to a corresponding emotion reply item or displayed when a corresponding emotion reply item is selected. For example, in some embodiments, when a cursor hovers over a corresponding emotion reply item for a period of time (for example, 1 s), the user name and/or user avatar of the user who replied to this emotion may be displayed. Consequently, an ordered arrangement between emotion reply items and reply information such as text may be implemented, the user entering the second topic interface is enabled to intuitively receive the reply information of the topic, and user interaction with the topic is facilitated.

In some embodiments, after returning to the session interface from the second topic interface, the first topic interface is displayed at a preset position of the session interface. That is, after the user enters a detail page (the second topic interface) of the first topic interface and returns, the first topic interface may be positioned to the first topic interface of the topic. For example, when returning to the session interface from the second topic interface of the corresponding topic, the first topic interface corresponding to the topic may be positioned to an upper edge, a lower edge, a middle part, or the like of the session interface. In this case, the user will not miss new topics posted after the topic, and may continue to view the new topics posted in the session interface from the topic, without going back to view the newly posted topics or the topics previously viewed in the second topic interface from other newly displayed topics.

In some embodiments, the session interface corresponds to a corresponding group in the session entry interface. For example, generally, a group is first created and displayed in the session entry interface. As shown in FIG. 10, group C is displayed in the session entry interface. In some embodiments, the information processing method further includes: when a first user in the group associates a second user outside the group with a topic, enabling the second user to join the group or join the topic. For example, there are users A, B, and C in group C. For a topic posted by A, if the first user B@a user D outside group C, it may be considered that B associates D with the topic. In this case, it may be defaulted that the second user D has joined group C or joined the topic. For the topic, when interaction with users outside the session interface is required, the interaction may be directly performed by means of @, which saves an operation of adding user D to the group and facilitates the interaction between the users and the topic. In some embodiments, the second user may be defaulted to join the group or join the topic, or a switch button is set and the second user joins the group or joins the topic when the switch button is turned on and the first user in the group associates the second user outside the group with the topic. In some embodiments, in order to better protect the privacy of users in the original group (such as group C), the second user may be set to see only the reply information of the user@him, but not to see the reply information of other users in the topic, or to see only the information after the second user is defaulted to join the group or the topic, but not to see the reply information about the topic before joining.

In some embodiments, the information processing method in the present disclosure further includes: when the topic is public, displaying interactive information related to the topic in the forwarded topic in response to forwarding the topic. That is, when the posted topic is public, forwarding the topic may display interactive information related to the topic, such as likes and replies. This setting facilitates users' forwarding operations. In some embodiments, in order to protect users' privacy, when the user on the session interface corresponding to the topic forwards the topic to another session group, the interactive information about the forwarded topic is visible to only the users in the original group and the forwarded group, and invisible to other users, so as to better protect users' privacy information.

In some embodiments, when the posted topic is private, in response to forwarding the topic, the information displayed in the forwarded topic is less than the information displayed in the topic before forwarding. Because the attribute setting of the topic is private, the poster does not desire to make the topic public. Therefore, the privacy of the interactive information for the topic information may also be protected by displaying less information in the forwarded topic, for example, displaying only the topic, rather than displaying the reply information about the topic.

In some embodiments, the information processing method in the present disclosures further includes: in response to a preset operation, initiating a session invitation for participants of the topic, or creating a session or a communication group based on participants of the topic. In some embodiments, the first topic interface may have a session invitation button. When the button is triggered (preset operation), a session invitation may be initiated for participants (such as posters and responders) in the topic to further communicate on the topic within the session. In this case, interaction on the topic is facilitated. A session creation button or a group creation button may alternatively be provided. After the session creation button is triggered, a session is created based on the participants of the topic (such as posters of the topic and posters of the reply information).

After the group creation button is triggered, a group is created and the participants of the topic are added to the group.

In some embodiments, the information processing method in the present disclosure further includes: generating the session interface in response to a preset operation on a session card. In some embodiments, for example, a session invitation with participation of some members in a group is posted in a group chat process. By triggering a session interface generation button for a session invitation card, a new group of all participants may be created to form a new session interface. Then, content of the session may be discussed in the newly generated session interface, for example, by posting various topics. This also facilitates interaction of the session content by posting topics in the session interface.

In the embodiment of the present disclosure, the topic interface is generated in the session interface of the instant messaging client, so that users may participate in topics of interest based on their interests. By joining or participating in the topics, content related to the topics they participate in in in the instant messaging client is displayed more intensively. Compared with sorting information in chronological order in a conventional client, users may communicate more conveniently, and find content related to the users themselves, without repeatedly searching for desired information, thereby improving information transmission efficiency.

In addition, when topic information is introduced in the instant messaging client, different attributes, different browsing requirements, and the like of topic related information from ordinary instant messaging messages pose new challenges to the organization and presentation of information in the instant messaging client. The solution of the present disclosure provides an optimal information transmission path and information display solution from complicated messages, thereby improving information transmission efficiency, saving user's time to search for information, and also saving computing resources consumed by message queries and the like.

Figure 11:
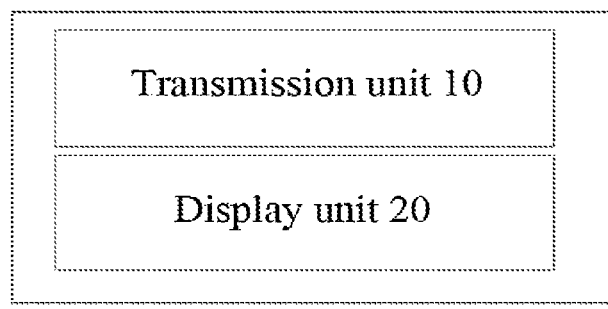
FIG. 11 is a composition diagram of an instant messaging apparatus according to an embodiment of the present disclosure.

Some embodiments of the present disclosure provide an instant messaging apparatus, as shown in FIG. 11, including:

a transmission unit 10, configured to receive input topic information and send the topic information to a server; and a display unit 20, configured to display the topic information in a preset topic format on a session interface of a session group, with a reply area in the preset topic format, where the transmission unit 10 is further configured to receive reply information for replying to the topic information; and the display unit 20 is further configured to display the reply information in the reply area of the topic information.

An embodiment of the present disclosure further provides an information processing apparatus, including a topic creation module and a topic interface generation module. In some embodiments, the topic creation module is configured to receive topic information at a session interface and initiate a topic creation request for the topic information to a server, so that the server makes a response of creating a topic. In some embodiments, the topic interface generation module is configured to generate a first topic interface for the topic at the session interface, where the session interface is used to display a plurality of first topic interfaces. It should be understood that the description of the information processing method also applies to the information processing apparatus here. For the sake of simplicity, details are not repeated here.

Figure 12:
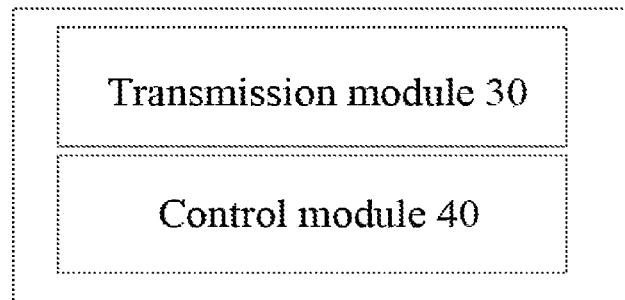
FIG. 12 is a composition diagram of a control apparatus for a server according to an embodiment of the present disclosure.

Some embodiments of the present disclosure further provide a control apparatus for a server, as shown in FIG. 12, including:

a transmission module 30, configured to receive topic information from a first user in a session group; and a control module 40, configured to associate the topic information with the first user, where the transmission module 30 is further configured to send the topic information to users in the session group;

the transmission module 30 is further configured to receive reply information from a second user in the session group;

the control module 40 is further configured to associate the reply information with the second user, where the reply information is used to reply to the topic information; and the transmission module 30 is further configured to send the reply information to users in the session group except the second user.

For embodiments of the device, which correspond essentially to the method embodiment, it is sufficient to refer to the partial description of the method embodiment where relevant. The above described embodiments of the device are only schematic, where the modules described as separate modules may or may not be separate. Some or all of these modules may be selected according to practical needs to achieve the purpose of this embodiment solution. It can be understood and implemented by a person of ordinary skill in the art without creative labor.

Above, the method and apparatus of the present disclosure are described based on embodiments and application examples. In addition, the present disclosure provides a terminal and a storage medium, which are described below.

Figure 13:
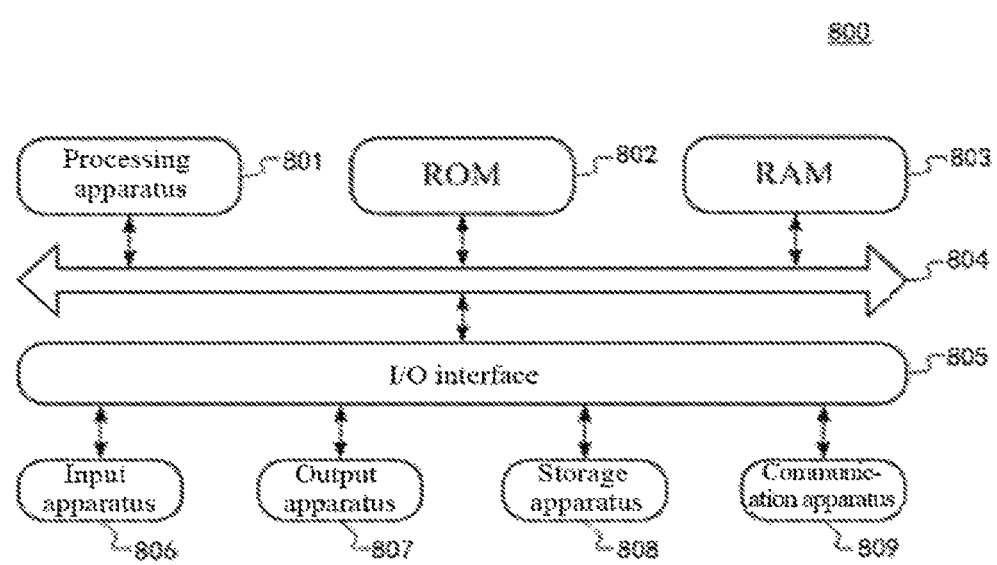
FIG. 13 is a schematic diagram of a structure of an electronic device according to an embodiment of the present disclosure.

Reference is made below to FIG. 13, which illustrates a schematic diagram of the structure of an electronic device (e.g., a terminal device or a server) 800 suitable for use in implementing embodiments of the present disclosure. Terminal devices in embodiments of the present disclosure may include, but are not limited to, mobile terminals such as a cell phone, a laptop computer, a digital radio receiver, a PDA (personal digital assistant), a PAD (tablet computer), a PMP (portable multimedia player), an in-vehicle terminal (e.g., an in-vehicle navigation terminal), and the like, and fixed terminals such as a digital TV, a desktop computer, and the like. The electronic device illustrated in the figures is only an example and should not impose any limitation on the functionality and scope of use of the embodiments of the present disclosure.

The electronic device 800 may include a processing apparatus (e.g., central processor, graphics processor, etc.) 801 that may perform various appropriate actions and processes based on programs stored in a read-only memory (ROM) 802 or loaded from a storage device 808 into a random access memory (RAM) 803. Also stored in RAM 803 are various programs and data required for the operation of electronic device 800. The processing device 801, ROM 802, and RAM 803 are connected to each other via bus 804. The input/output (I/O) interface 805 is also connected to the bus 804.

Typically, the following devices can be connected to I/O interface 805: input apparatus 806 including, for example, touch screens, touch pads, keyboards, mice, cameras, microphones, accelerometers, gyroscopes, etc.; output apparatus 807 including, for example, liquid crystal displays (LCDs), speakers, vibrators, etc.; storage apparatus 808 including, for example, magnetic tapes, hard drives, etc.; and communication apparatus 809. communication apparatus 809 may allow the electronic device 800 to communicate wirelessly or wired with other devices to exchange data. Although the drawings illustrate the electronic device 800 with various devices, it should be understood that it is not required to implement or have all of the devices illustrated. More or fewer devices may alternatively be implemented or available.

In particular, according to embodiments of the present disclosure, the process described above with reference to the flowchart may be implemented as a computer software program. For example, embodiments of the present disclosure include a computer program product comprising a computer program carried on a computer readable medium, the computer program comprising program code for performing the method shown in the flowchart. In such an embodiment, the computer program may be downloaded and installed from a network via a communication apparatus 809, or from a storage apparatus 808, or from a ROM 802. When this computer program is executed by the processing apparatus 801, the above-described functions as defined in the method of this disclosed embodiment are performed.

It is to be noted that the computer-readable medium described above in this disclosure may be a computer-readable signal medium or a computer-readable storage medium or any combination of the above. The computer readable storage medium may be, for example—but not limited to—an electrical, magnetic, optical, electromagnetic, infrared, or semiconductor system, device, or device, or any combination of the above. More specific examples of computer-readable storage media may include, but are not limited to: electrically connected with one or more wires, portable computer disks, hard disks, random access memory (RAM), read-only memory (ROM), erasable programmable read-only memory (EPROM or flash memory), optical fiber, portable compact disk read-only memory (CD-ROM), optical storage devices, or any of the above, magnetic memory devices, or any suitable combination of the foregoing. In the present disclosure, a computer-readable storage medium may be any tangible medium that contains or stores a program that may be used by or in combination with an instruction execution system, device, or device. And in the present disclosure, a computer-readable signal medium may include a data signal propagated in the baseband or as part of a carrier wave that carries computer-readable program code. Such propagated data signals may take a variety of forms, including but not limited to electromagnetic signals, optical signals, or any suitable combination of the foregoing. Computer-readable signal medium can also be any computer-readable medium other than computer-readable storage media, the computer-readable signal medium can send, propagate or transmit the program for use by or in combination with the instruction execution system, device or device. The program code contained on the computer-readable medium may be transmitted using any suitable medium, including but not limited to: wire, fiber optic cable, RF (radio frequency), etc., or any suitable combination of the above.

In some implementations, the client, server may communicate using any currently known or future developed network protocol such as HTTP (HyperText Transfer Protocol), and may interconnect with any form or medium of digital data communication (e.g., a communication network). Examples of communication networks include local area networks ("LANs"), wide area networks ("WANs"), inter-networks (e.g., the Internet), and end-to-end networks (e.g., ad hoc end-to-end networks), as well as any currently known or future developed networks.

The above computer readable medium may be contained in the above electronic device; or it may be present separately and not assembled into the electronic device.

The above computer readable medium carries one or more programs which, when executed by the electronic device, cause the electronic device to perform the method of the present disclosure as described above.

Computer program code for performing the operations of the present disclosure may be written in one or more programming languages or combinations thereof, said programming languages including object-oriented programming languages—such as Java, Smalltalk, C++, and also including conventional procedural programming languages—such as "C" language or similar programming languages. The program code may be executed entirely on the user's computer, partially on the user's computer, as a stand-alone package, partially on the user's computer and partially on a remote computer, or entirely on a remote computer or server. In the case of a remote computer, the remote computer may be connected to the user computer over any kind of network—including a local area network (LAN) or a wide area network (WAN)—or, alternatively, may be connected to an external computer (e.g., using an Internet service provider to connect over the Internet).

The flowcharts and block diagrams in the accompanying drawings illustrate the possible implementations of the architecture, functionality, and operation of systems, methods, and computer program products in accordance with various embodiments of the present disclosure. At this point, each box in a flowchart or block diagram may represent a module, program segment, or portion of code that contains one or more executable instructions for implementing a specified logical function. It should also be noted that in some implementations as replacements, the functions indicated in the boxes may also occur in a different order than that indicated in the accompanying drawings. For example, two boxes represented one after the other can actually be executed in substantially parallel, and they can sometimes be executed in the opposite order, depending on the function involved. Note also that each box in the block diagram and/or flowchart, and the combination of boxes in the block diagram and/or flowchart, may be implemented with a dedicated hardware-based system that performs the specified function or operation, or may be implemented with a combination of dedicated hardware and computer instructions.

The units described in the embodiments of the present disclosure may be implemented by means of software, or by means of hardware. Wherein, the name of the unit does not in a certain case constitute a limitation of the unit itself The functions described above herein may be performed, at least in part, by one or more hardware logic components. For example, non-limitingly, exemplary types of hardware logic components that may be used include: field-programmable gate arrays (FPGAs), application-specific integrated circuits (ASICs), application-specific standard products (ASSPs), systems-on-chip (SOCs), complex programmable logic devices (CPLDs), and the like.

In the context of the present disclosure, a machine-readable medium may be a tangible medium that may contain or store a program for use by or in conjunction with an instruction execution system, device, or apparatus. The machine-readable medium may be a machine-readable signal medium or a machine-readable storage medium. Machine readable media may include, but are not limited to, electronic, magnetic, optical, electromagnetic, infrared, or semiconductor systems, devices, or equipment, or any suitable combination of the foregoing. More specific examples of machine-readable storage media would include one or more wire-based electrical connections, portable computer disks, hard disks, random access memory (RAM), read-only memory (ROM), erasable programmable read-only memory (EPROM or flash memory), optical fiber, convenient compact disk read-only memory (CD-ROM), optical storage devices, magnetic storage devices, or any suitable combination of the above any suitable combination of the above.

According to one or more embodiments of the present disclosure, provide an information processing method, comprising:

receiving input topic information and sending the topic information to a server;

displaying the topic information in a preset topic format on a session interface of a session group, with a reply area in the preset topic format;

receiving reply information for replying to the topic information; and displaying the reply information in the reply area of the topic information.

According to one or more embodiments of the present disclosure, provide an information processing method, the receiving reply information for replying to the topic information comprises:

receiving the input reply information and sending the reply information to the server, or receiving the reply information from the server.

According to one or more embodiments of the present disclosure, provide an information processing method, the session interface displays a topic creation identifier, a topic input box is displayed after the topic creation identifier is triggered, and receiving the topic information input through the topic input box; or the session interface displays an information input box, and receiving the topic information input through the information input box on the session interface.

According to one or more embodiments of the present disclosure, provide an information processing method, the preset topic format has a reply identifier, and a reply input box is displayed in the preset format after the reply identifier is triggered, wherein the reply input box is used to input the reply information.

According to one or more embodiments of the present disclosure, provide an information processing method, the preset topic format comprises: a topic display area, the reply area, and a topic related area:

the topic related area comprises at least one of a topic creator area, a topic creation time area, and a topic name area.

According to one or more embodiments of the present disclosure, provide an information processing method, when the number of reply information in the reply area exceeds a preset number or the space occupied by the reply information reaches a preset threshold, the reply area is folded and an unfolding identifier is displayed, wherein the unfolding identifier is used to unfold the reply area.

According to one or more embodiments of the present disclosure, provide an information processing method, the session interface comprises: a first sub-interface and a second sub-interface;

the first sub-interface is used to display all topic information of the session group; and the second sub-interface is used to display topic information related to a current user.

According to one or more embodiments of the present disclosure, provide an information processing method, at least one type identifier is displayed in the second sub-interface; and after any type identifier is triggered, topic information associated with the triggered type identifier in the related topic information is displayed.

According to one or more embodiments of the present disclosure, provide an information processing method, the type identifier comprises at least one of the following:

all related topic information, user created topic information, user replied topic information, user subscribed topic information, and topic information sent to users as reminders.

According to one or more embodiments of the present disclosure, provide an information processing method, further comprising:

receiving reminder information sent by another user in the session group to the current user, and displaying, at a preset position of the session interface, an identity of the user who sent the reminder information.

According to one or more embodiments of the present disclosure, provide an information processing method, the session interface of the session group is a group chat interface of a user group, or a single chat interface between two users.

According to one or more embodiments of the present disclosure, provide an information processing method, types of the user group comprises: a topic group and a chat group;

a group chat interface of the topic group is used to post topic information and reply information for replying to the topic information;

a group chat interface of the chat group is used to post non-topic information; and the session interface of the session group is the chat interface of the topic group.

According to one or more embodiments of the present disclosure, provide an information processing method, types of the user group comprises: a topic group and a chat group;

a group chat interface of the topic group is used to post topic information and reply information for replying to the topic information;

a group chat interface of the chat group is used for to post topic information, reply information for replying to the topic information, and non-topic information; and the session interface of the session group is the chat interface of the topic group or the group chat interface of the chat group.

According to one or more embodiments of the present disclosure, provide an information processing method, wherein the session interface corresponds to a corresponding group in a session entry interface, and the information processing method further comprises: defaulting a second user outside the group to join the group or join the topic when a first user in the group associates the second user with the topic information.

According to one or more embodiments of the present disclosure, provide an information processing method, further comprising:

when the topic information is public, in response to forwarding the topic information, displaying interactive information related to the topic information in the forwarded topic information; or when the topic information is private, in response to forwarding the topic information, determining that the information displayed in the forwarded topic information is less than the information displayed in the topic information before forwarding.

According to one or more embodiments of the present disclosure, provide an information processing method, further comprising:

in response to a preset operation, initiating a session invitation for participants of the topic information, or creating a session or a communication group based on participants of the topic information.

According to one or more embodiments of the present disclosure, provide a control method for a server, comprising:

receiving topic information from a first user in a session group;

associating the topic information with the first user;

sending the topic information to users in the session group;

receiving reply information from a second user in the session group;

associating the reply information and the topic information with the second user, wherein the reply information is used to reply to the topic information; and sending the reply information to users in the session group except the second user.

According to one or more embodiments of the present disclosure, provide an information processing method, comprising: receiving topic information at a session interface of an instant messaging client, and initiating a topic creation request for the topic information to a server, so that the server makes a response of creating a topic; and generating a first topic interface for the topic at the session interface, wherein the session interface is used to display a plurality of first topic interfaces.

According to one or more embodiments of the present disclosure, further comprising: displaying preset shortcut reply items and quantities of operations on the preset shortcut reply items on the first topic interface.

According to one or more embodiments of the present disclosure, the first topic interface further comprises a reply display area for displaying reply information specific to the topic.

According to one or more embodiments of the present disclosure, wherein the reply display area displays several pieces of reply information and summary information of all the reply information, or summary information of reply information that is not displayed in the reply display area.

According to one or more embodiments of the present disclosure, the some reply information comprises a preset quantity of reply information, or reply information occupying a preset display space; or the summary information comprises one or more of the following: a total quantity of all the reply information, a quantity of the reply information that is not displayed, and sender identifiers of reply information that satisfies preset conditions.

According to one or more embodiments of the present disclosure, wherein the first topic interface comprises a reply area for receiving a reply trigger operation; displaying a first reply input area in response to receiving the reply trigger operation; receiving reply content input in the first reply input area; and sending the received reply content in response to receiving a sending instruction.

According to one or more embodiments of the present disclosure, further comprising: in response to receiving a trigger operation of entering a topic, displaying a second topic interface corresponding to the trigger operation, wherein the second topic interface displays topic information of the corresponding topic, reply information about the topic, and a second reply input area; receiving reply content input in the second reply input area; and sending the received reply content in response to receiving a sending instruction.

According to one or more embodiments of the present disclosure, wherein the second topic interface covers the session interface; and the second topic interface displays a return control for returning to the session interface upon receiving a return trigger operation.

According to one or more embodiments of the present disclosure, wherein the second topic interface displays all reply information about the topic.

According to one or more embodiments of the present disclosure, wherein input controls in the first reply input area are fewer than those in the second reply input area.

According to one or more embodiments of the present disclosure, wherein quick reply items are unfolded and displayed after the second topic interface is displayed, and a user name and/or a user avatar of a user who replied to a corresponding emotion are displayed next to a corresponding emotion reply item or displayed when a corresponding emotion reply item is selected.

According to one or more embodiments of the present disclosure, wherein after returning to the session interface, the first topic interface is displayed at a preset position of the session interface.

According to one or more embodiments of the present disclosure, wherein the session interface corresponds to a corresponding group in a session entry interface, and the information processing method further comprises: when a first user in the group associates a second user outside the group with a topic, enabling the second user to join the group or join the topic.

According to one or more embodiments of the present disclosure, further comprising: when the topic is public, displaying the topic information and interactive information related to the topic in the forwarded topic in response to forwarding the topic; or, when the topic is private, in response to forwarding the topic, determining that the information displayed in the forwarded topic is less than the information displayed in the topic before forwarding.

According to one or more embodiments of the present disclosure, further comprising: in response to a preset operation, initiating a session invitation for participants of the topic, or creating a session or a communication group based on participants of the topic.

According to one or more embodiments of the present disclosure, provide a control method for a server, further comprising:
  associating the session group with the topic information.

According to one or more embodiments of the present disclosure, provide a control method for a server, wherein the second user is a user in a specified user group in the session group; or
  the second user is any user in the session group.

According to one or more embodiments of the present disclosure, provide a control method for a server, further comprising:
  receiving an obtaining request from a third user in the session group;
  obtaining target topic information associated with the third user; and
  sending the target topic information to the third user to display the target topic information in a client of the third user.

According to one or more embodiments of the present disclosure, provide an information processing method, comprising:
  in responding to a topic information posted in a session group by a first user in the session group, recording an association relationship between the topic information and the session group, and recording an association relationship between the first user and the topic information.

According to one or more embodiments of the present disclosure, provide an information processing method, comprising: in responding to performing a preset action on the topic information by a second user in the session group, recording the preset action, and recording an association relationship between the second user and the preset action;

According to one or more embodiments of the present disclosure, provide an information processing method, comprising: obtaining topic information posted in a session group by a first user in the session group;
  recording an association relationship between the topic information and the session group, and recording an association relationship between the first user and the topic information; or obtaining a preset action performed by a second user in the session group on the topic information, recording the preset action, and recording an association relationship between the second user and the preset action; or obtaining reply information about the topic information, and recording the reply information and an association relationship between the topic information and the reply information; and
  in response to receiving an information obtaining request, filtering, based on a target identifier corresponding to the information obtaining request, the topic information associated with the target identifier, and returning the filtered topic information, wherein the target identifier comprises one or more of a session group identifier, a user identifier, and a topic identifier.

According to one or more embodiments of the present disclosure, provide an instant messaging apparatus, comprising:
  a transmission unit, configured to receive input topic information and send the topic information to a server;
  a display unit, configured to display the topic information in a preset topic format on a session interface of a session group, with a reply area in the preset topic format;
  the transmission unit is further configured to receive reply information for replying to the topic information;
  the display unit is further configured to display the reply information in the reply area of the topic information.

According to one or more embodiments of the present disclosure, provide an instant messaging apparatus, comprises: a topic creation module, configured to receive topic information at a session interface and initiate a topic creation request for the topic information to a server, so that the server makes a response of creating a topic; and a topic interface generation module, configured to generate a first topic interface for the topic at the session interface, wherein the session interface is used to display a plurality of first topic interfaces.

According to one or more embodiments of the present disclosure, provide control apparatus for a server, comprising:
  a transmission module, configured to receive topic information from a first user in a session group;
  a control module, configured to associate the topic information with the first user;
  the transmission module is further configured to send the topic information to users in the session group;
  the transmission module is further configured to receive reply information from a second user in the session group;
  the control module is further configured to associate the reply information with the second user, wherein the reply information is used to reply to the topic information;
  the transmission module is further configured to send the reply information to users in the session group except the second user.

According to one or more embodiments of the present disclosure, provide a terminal, comprising: at least one memory and at least one processor;
  Wherein the at least one memory is configured to store program code, and the at least one processor is configured to call the program code stored in the at least one memory to perform the method according to any one of above.

According to one or more embodiments of the present disclosure, provide a computer-readable storage medium for storing program code, wherein when the program code is executed by a processor, the processor is enabled to perform the method according to any one of above.

The above description is only a better embodiment of the present disclosure and a description of the technical principles applied. It should be understood by those skilled in the art that the scope of the disclosure covered by the present disclosure is not limited to technical solutions resulting from a particular combination of the technical features described above, but should also cover other technical solutions resulting from any combination of the technical features described above or their equivalent features without departing from the above disclosed idea. For example, the above features are interchangeable with (but not limited to) the technical features with similar functions disclosed in this disclosure.

Furthermore, although a specific order is used to depict the individual operations, this should not be interpreted as requiring that these operations be executed in the specific order shown or in sequential order of execution. Multitasking and parallel processing may be advantageous in certain environments. Again, while several specific implementation details are included in the above discussion, these should not be construed as limiting the scope of the present disclosure. Certain features described in the context of separate embodiments may also be implemented in combination in a single embodiment. Conversely, various features described in the context of a single embodiment may also be implemented in multiple embodiments individually or in any suitable subcombination.

Although the present subject matter has been described using language specific to structural features and/or method logical actions, it should be understood that the subject matter defined in the appended claims is not necessarily limited to the particular features or actions described above. Rather, the particular features and actions described above are merely exemplary forms of claim fulfillment.

What is claimed is:

1. An information processing method, comprising:
   displaying a topic creation identifier on a session interface of a particular group, wherein the session interface of the particular group is configured to display messages communicated between users of the particular group;
   displaying a topic input box on the session interface of the particular group in response to the topic creation identifier being triggered;
   receiving topic information input via the topic input box on the session interface of the particular group and sending the topic information to a server;
   displaying the topic information in a preset topic format on the session interface of the particular group, wherein the preset topic format comprises an interface element displayed approximately at a same location where the topic information is displayed, wherein the interface element is configured to trigger display of a reply input box by which reply information related to the topic information is received, and wherein the preset topic format comprises a reply area configured to display the reply information related to the topic information;
   receiving the reply information related to the topic information; and
   displaying the reply information related to the topic information in the reply area, wherein the topic information and the reply information related to the topic information are displayed approximately at the same location on the session interface of the particular group.

2. The method according to claim 1,
   wherein the receiving reply information for replying to the topic information comprises:
   receiving the input reply information and sending the reply information to the server, or receiving the reply information from the server;
   and/or,
   the session interface displays a topic creation identifier, a topic input box is displayed after the topic creation identifier is triggered, and receiving the topic information input through the topic input box,
   or,
   the receiving input topic information comprises: in response to inputting and posting a communication information through an information input box of a session interface of an instant messaging client, posting the communication information as the topic information directly without any other operation.

3. The method according to claim 1, wherein
   the preset topic format has a reply identifier, and a reply input box is displayed in the preset format after the reply identifier is triggered, wherein the reply input box is used to input the reply information;
   and/or,
   the preset topic format comprises: a topic display area, the reply area, and a topic related area:
   the topic related area comprises at least one of a topic creator area, a topic creation time area, and a topic name area;
   and/or,
   when the number of reply information in the reply area exceeds a preset number or the space occupied by the reply information reaches a preset threshold, the reply area is folded and an unfolding identifier is displayed, wherein the unfolding identifier is used to unfold the reply area.

4. The method according to claim 1, wherein
   the session interface comprises: a first sub-interface and a second sub-interface;
   the first sub-interface is used to display all topic information of the session group; and
   the second sub-interface is used to display topic information related to a current user.

5. The method according to claim 4, wherein
   at least one type identifier is displayed in the second sub-interface; and
   after any type identifier is triggered, topic information associated with the triggered type identifier in the related topic information is displayed.

6. The method according to claim 5, wherein
   the type identifier comprises at least one of the following:
   all related topic information, user created topic information, user replied topic information, user subscribed topic information, and topic information sent to users as reminders.

7. The method according to claim 1, further comprising:
   receiving reminder information sent by another user in the session group to the current user, and displaying, at a preset position of the session interface, an identity of the user who sent the reminder information.

8. The method according to claim 1, wherein
   the session interface of the session group is a group chat interface of a user group, or a single chat interface between two users.

9. The method according to claim 8, wherein
   types of the user group comprise: a topic group and a chat group; a group chat interface of the topic group is used to post topic information and reply information for replying to the topic information; a group chat interface of the chat group is used to post non-topic information; and the session interface of the session group is the chat interface of the topic group;
   or,
   types of the user group comprise: a topic group and a chat group; a group chat interface of the topic group is used to post topic information and reply information for replying to the topic information; a group chat interface of the chat group is used for to post topic information, reply information for replying to the topic information, and non-topic information; and the session interface of the session group is the chat interface of the topic group or the group chat interface of the chat group.

10. The method according to claim 1, wherein the session interface corresponds to a corresponding group in a session entry interface, and the information processing method further comprises:
 defaulting a second user outside the group to join the group or join the topic when a first user in the group associates the second user with the topic information.

11. The method according to claim 1,
the information processing method further comprising:
 when the topic information is public, in response to forwarding the topic information, displaying interactive information related to the topic information in the forwarded topic information; or when the topic information is private, in response to forwarding the topic information, determining that the information displayed in the forwarded topic information is less than the information displayed in the topic information before forwarding;
and/or,
the information processing method further comprising: in response to a preset operation, initiating a session invitation for participants of the topic information, or creating a session or a communication group based on participants of the topic information.

12. A control method for a server, comprising:
receiving topic information from a first user in a session group via a session interface of the session group, wherein the session interface of the session group is configured to display messages communicated between users of the session group, wherein the topic information is received via a topic input box displayed on the session interface of the session group, wherein the topic input box is displayed in response to a topic creation identifier on the session interface of the session group being triggered, wherein a preset topic format in which the topic information is displayed comprises an interface element displayed approximately at a same location where the topic information is displayed, wherein the interface element is configured to trigger display of a reply input box by which reply information related to the topic information is received, and wherein the preset topic format comprises a reply area configured to display reply information related to the topic information;
associating the topic information with the first user;
sending the topic information to users in the session group;
receiving reply information from a second user in the session group;
associating the reply information and the topic information with the second user, wherein the reply information is related to the topic information; and
sending the reply information to users in the session group except the second user, wherein the topic information and the reply information related to the topic information are displayed approximately at the same location on the session interface.

13. The method according to claim 12,
the receiving topic information from a first user in a session group, comprises: receiving the topic information from the first user in the session group of an instant messaging client, wherein, the instant messaging client in response to inputting and posting a communication information through an information input box of a session interface of the instant messaging client, posting the communication information as the topic information directly without any other operation;
and/or,
the control method for a server further comprising: associating the session group with the topic information;
and/or,
the second user is a user in a specified user group in the session group; or the second user is any user in the session group;
and/or,
the control method for a server further comprising: receiving an obtaining request from a third user in the session group; obtaining target topic information associated with the third user; and sending the target topic information to the third user to display the target topic information in a client of the third user.

14. An information processing method, comprising:
obtaining topic information posted in a session group by a first user in the session group, wherein the topic information is posed via a session interface of the session group, wherein the session interface of the session group is configured to display messages communicated between users of the session group, wherein the topic information is received via a topic input box displayed on the session interface of the session group, wherein the topic input box is displayed in response to a topic creation identifier on the session interface of the session group being triggered, wherein the topic information is displayed in a preset topic format on the session interface, wherein the preset topic format comprises an interface element displayed approximately at a same location where the topic information is displayed, wherein the interface element is configured to trigger display of a reply input box by which reply information related to the topic information is received, wherein the preset topic format comprises a reply area configured to display the reply information related to the topic information, and wherein the topic information and the reply information related to the topic information are displayed approximately at the same location on the session interface;
recording an association relationship between the topic information and the session group, and recording an association relationship between the first user and the topic information; or obtaining a preset action performed by a second user in the session group on the topic information, recording the preset action, and recording an association relationship between the second user and the preset action; or obtaining reply information about the topic information, and recording the reply information and an association relationship between the topic information and the reply information; and
in response to receiving an information obtaining request, filtering, based on a target identifier corresponding to the information obtaining request, the topic information associated with the target identifier, and returning the filtered topic information, wherein the target identifier comprises one or more of a session group identifier, a user identifier, and a topic identifier.

15. The information processing method according to claim 14, wherein, an instant messaging client in response to inputting and posting a communication information through an information input box of a session interface of the instant messaging client, posting the communication information as the topic information directly without any other operation.

16. An information processing method, comprising:
receiving topic information at a session interface of an instant messaging application, and initiating a topic creation request for the topic information to a server such that the server makes a response of creating a topic, wherein the session interface is configured to display messages communicated between users of a particular group, wherein the topic information is received via a topic input box displayed on the session interface, and wherein the topic input box is displayed in response to a topic creation identifier on the session interface being triggered; and generating a first topic interface for the topic at the session interface, wherein the session interface is configured to display a plurality of first topic interfaces corresponding to a plurality of topics, wherein the first topic interface comprises a reply area in which reply content related to the topic is displayed, wherein the reply area comprises an interface element configured to trigger display of a reply input box by which the reply content related to the topic is received, and wherein the topic and the reply content related to the topic are displayed approximately at a same location on the session interface.

17. The information processing method according to claim 16, the information processing method further comprising: the first topic interface having a session invitation button, in response to a preset operation on the session invitation button in the first topic interface, initiating a session invitation for participants of the topic, wherein the participants include posters and/or responders of the topic;

and/or, the information processing method further comprising: displaying preset shortcut reply items and quantities of operations on the preset shortcut reply items on the first topic interface;

and/or, the first topic interface comprises a reply area for receiving a reply trigger operation; the information processing method further comprising: displaying a first reply input area in response to receiving the reply trigger operation; receiving reply content input in the first reply input area; and sending the received reply content in response to receiving a sending instruction.

18. The information processing method according to claim 16, wherein the first topic interface further comprises a reply display area for displaying reply information specific to the topic.

19. The information processing method according to claim 18, wherein the reply display area displays several pieces of reply information and summary information of all the reply information, or summary information of reply information that is not displayed in the reply display area.

20. The information processing method according to claim 19, wherein the some reply information comprises a preset quantity of reply information, or reply information occupying a preset display space; or the summary information comprises one or more of the following:

a total quantity of all the reply information, a quantity of the reply information that is not displayed, and sender identifiers of reply information that satisfies preset conditions.

21. The information processing method according to claim 16, further comprising:

in response to receiving a trigger operation of entering a topic, displaying a second topic interface corresponding to the trigger operation, wherein the second topic interface displays topic information of the corresponding topic, reply information about the topic, and a second reply input area;

receiving reply content input in the second reply input area; and sending the received reply content in response to receiving a sending instruction.

22. The information processing method according to claim 21, wherein the second topic interface covers the session interface; and the second topic interface displays a return control for returning to the session interface upon receiving a return trigger operation.

23. The information processing method according to claim 22, wherein the second topic interface displays all reply information about the topic;

and/or, wherein after returning to the session interface, the first topic interface is displayed at a preset position of the session interface.

24. The information processing method according to claim 21, wherein input controls in the first reply input area are fewer than those in the second reply input area;

and/or, wherein quick reply items are unfolded and displayed after the second topic interface is displayed, and a user name and/or a user avatar of a user who replied to a corresponding emotion are displayed next to a corresponding emotion reply item or displayed when a corresponding emotion reply item is selected.

25. The information processing method according to claim 16, wherein the session interface corresponds to a corresponding group in a session entry interface, and the information processing method further comprises: when a first user in the group associates a second user outside the group with a topic, enabling the second user to join the group or join the topic;

and/or, the information processing method further comprising: when the topic is public, displaying the topic information and interactive information related to the topic in the forwarded topic in response to forwarding the topic; or when the topic is private, in response to forwarding the topic, determining that the information displayed in the forwarded topic is less than the information displayed in the topic before forwarding;

and/or, the information processing method further comprising: in response to a preset operation on a session interface generation button of a session card, creating a new group of session participants in the session card, and creating a new session interface.

* * * * *